US010002034B2

(12) United States Patent
Li et al.

(10) Patent No.: US 10,002,034 B2
(45) Date of Patent: Jun. 19, 2018

(54) SYSTEM AND METHOD FOR DETECTING, COLLECTING, ANALYZING, AND COMMUNICATING EVENT-RELATED INFORMATION

(71) Applicant: Georgetown University, Washington, DC (US)

(72) Inventors: Peter C. Li, McLean, VA (US); Manabu Torii, Newark, DE (US); David M. Hartley, Rockville, MD (US); Noele P. Nelson, Atlanta, GA (US)

(73) Assignee: Georgetown University, Washington, DC (US)

( * ) Notice: Subject to any disclaimer, the term of this patent is extended or adjusted under 35 U.S.C. 154(b) by 789 days.

(21) Appl. No.: 14/218,123

(22) Filed: Mar. 18, 2014

(65) Prior Publication Data

US 2016/0170814 A1 Jun. 16, 2016
US 2017/0329653 A9 Nov. 16, 2017
US 2018/0121263 A9 May 3, 2018

Related U.S. Application Data

(63) Continuation-in-part of application No. 13/883,515, filed as application No. PCT/US2011/059594 on Nov. 7, 2011, now abandoned, and a continuation-in-part of application No. 13/090,742, filed on Apr. 20, 2011, now Pat. No. 9,746,985, which is a continuation-in-part of application No. 12/629,706, filed on Dec. 2, 2009, now Pat. No. 8,881,040, which is a continuation-in-part of application No. 13/192,160, filed on Jul. 27, 2011,
(Continued)

(51) Int. Cl.
G06F 15/16 (2006.01)
G06F 9/54 (2006.01)
G06F 17/30 (2006.01)

(52) U.S. Cl.
CPC ........ *G06F 9/542* (2013.01); *G06F 17/30867* (2013.01)

(58) Field of Classification Search
CPC ................................................ H04L 29/08072
USPC ........................................ 709/217, 218, 219
See application file for complete search history.

(56) References Cited

U.S. PATENT DOCUMENTS 7,499,715 B2 * 3/2009 Carro ................. H04M 1/72566
455/414.1
8,049,614 B2 * 11/2011 Kahn ................... G06F 19/3493
340/521

(Continued)

OTHER PUBLICATIONS

A Heuristic Indication and Warning Staging Model for Detection and Assessment of Biological Events, Journal of the American Medical Informatics Association, Mar./Apr. 2008; vol. 15, No. 2, pp. 158-171, by Wilson et al.
The MiTAP System for Monitoring Reports of Disease Outbreak (2004), by L.E. Damianos et al.
Third-Party Submission under 37 C.F.R. 1.290—Concise Description of Relevance, 2 pages.

*Primary Examiner* — Andy Ho
(74) *Attorney, Agent, or Firm* — Blank Rome LLP; Michael C. Greenbaum

(57) ABSTRACT

A system and method involves detecting operational social disruptive events on a global scale, modeling data in conjunction with linguistics analysis to establish responsive actions, and generating visualization and executing models for communicating information.

29 Claims, 20 Drawing Sheets

Related U.S. Application Data now Pat. No. 9,529,974, which is a continuation-in-part of application No. 12/230,397, filed on Aug. 28, 2008, now Pat. No. 9,489,495.

(60) Provisional application No. 61/792,579, filed on Mar. 15, 2013, provisional application No. 61/344,895, filed on Nov. 5, 2010, provisional application No. 61/368,054, filed on Jul. 27, 2010, provisional application No. 61/064,256, filed on Feb. 25, 2008, provisional application No. 61/046,275, filed on Apr. 18, 2008, provisional application No. 61/077,713, filed on Jul. 2, 2008.

(56) References Cited

U.S. PATENT DOCUMENTS

| | | | | |
|---|---|---|---|---|
| 8,489,599 | B2* | 7/2013 | Bellotti | G06F 17/30056 |
| | | | | 707/736 |
| 8,762,285 | B2* | 6/2014 | Davis | G06Q 30/02 |
| | | | | 705/319 |
| 8,775,406 | B2 | 7/2014 | Gross | |
| 2009/0005076 | A1* | 1/2009 | Forstall | G06Q 30/02 |
| | | | | 455/456.2 |
| 2013/0218971 | A1* | 8/2013 | Sasaki | H04W 4/00 |
| | | | | 709/204 |
| 2014/0316911 | A1 | 10/2014 | Gross | |

* cited by examiner

SYSTEM AND METHOD FOR DETECTING, COLLECTING, ANALYZING, AND COMMUNICATING EVENT-RELATED INFORMATION

CROSS-REFERENCE TO RELATED APPLICATIONS

The present application claims the benefit of U.S. Provisional Patent Application No. 61/792,579, filed Mar. 15, 2013. The present application also is a continuation-in-part of U.S. patent application Ser. No. 13/883,515, filed May 3, 2013, now abandoned, which is the U.S. national stage of International Patent Application No. PCT/US11/59594, filed Nov. 7, 2011, now expired, which claims the benefit of U.S. Provisional Application No. 61/344,895, filed Nov. 5, 2010, and which is a continuation-in-part of U.S. patent application Ser. No. 13/090,742, filed Apr. 20, 2011, currently pending, which is a continuation-in-part of U.S. patent application Ser. No. 12/629,706, filed Dec. 2, 2009, now U.S. Pat. No. 8,881,040, issued Jul. 10, 2012, which is a continuation-in-part of U.S. patent application Ser. No. 12/230,397, filed Aug. 28, 2008, now U.S. Pat. No. 9,489,495, issued Nov. 8, 2016, which claims priority to U.S. Provisional Patent Application Ser. Nos. 61/064,256, filed Feb. 25, 2008, 61/046,275, filed Apr. 18, 2008, and 61/077,713, filed Jul. 2, 2008. The present application is also a continuation-in-part of U.S. patent application Ser. No. 13/192,160, filed Jul. 27, 2011, now U.S. Pat. No. 9,529,974, issued Dec. 27, 2016, which claims the benefit of U.S. Provisional Patent Application No. 61/368,054, filed Jul. 27, 2010, and which is also a continuation-in-part of the above-noted U.S. patent application Ser. No. 12/230,397, filed Aug. 28, 2008, now U.S. Pat. No. 9,489,495, issued Nov. 8, 2016. The disclosures of all of the above-captioned applications are hereby incorporated by reference in their entireties into the present application.

STATEMENT REGARDING FEDERALLY SPONSORED RESEARCH OR DEVELOPMENT

This invention is related to federally sponsored research and development under ITIC contract number 2006-1016 426-000, TATRC contract numbers W81XWH-04-1-0857 and DAMD17-94-V-4015, NLM Contract number N01-LM-3-3306, and DC DOH Contract number PO-HC-2004-P-1545, OSC contract number 2008-1176516-000, and 2011-11061500009. The invention was made with U.S. government support. The U.S. government has certain rights in the invention.

BACKGROUND OF THE INVENTION

Field of the Invention

The present invention involves detecting and tracking socially disruptive events, such as but not limited to communicable disease outbreaks, civil unrest, and animal and plant disease, and the collection, analysis, workflow management, and reporting of information related to those events using various communications modes.

Description of the Related Art

In "A Heuristic Indication and Warning Staging Model for Detection and Assessment of Biological Events," Journal of the American Medical Informatics Association, March/April 2008; vol. 15, No. 2, pp. 158-171, by Wilson et al., the development of a disease surveillance system is described. The article refers to previous technologies developed by others that, in conjunction with the co-authors' work, formed the basis for the invention described in U.S. Pat. No. 7,725,565 ("the '565 patent"), and co-pending U.S. patent application Ser. No. 12/230,397 ("the '397 application"), both owned by assignee Georgetown University. Those patent references describe a system and method for detecting operational socially-disruptive events on a global scale, assigning or associating event severity values or indicia to the event data, modeling the data in conjunction with linguistics analysis to establish responsive actions, generating visualization and modeling capabilities for communicating event information, and modeling event propagation for containment and forecasting purposes. U.S. patent application Ser. No. 13/192,160 ("the '160 application"), which is also owned by assignee Georgetown University, extends the above system and method to events impacting plants, and includes a specific text classification scheme.

The common specification in the '565 patent and the '397 application describes the history and development of open-source surveillance as a methodology for detecting events to preserve human health and economic well-being as a result of dense populations and frequent air travel, both of which can affect the emergence and development of events on a global scale. Those patent references also describe numerous historical disease outbreaks, emergent animal and plant diseases, civil unrest events, weapons of mass destruction events, and other event types, all of which are postulated to affect economic and social institutions. Those patent references also mention other surveillance systems, most of which relate to monitoring biological events such as, but not limited to, influenza and bird flu.

In the '565 patent and the '397 application, the system and method of detecting global events using indications and warnings (I&Ws) related to events is described. Indications and warnings, however, have been used prior to the inventions described in the '565 patent and the '397 application, including their use in describing events that might disrupt the everyday social life of individuals, communities, and institutions. It is well known that I&Ws may appear in local, regional, or national media sources related to one or more events, whether or not those events are expressly recognized or not.

Event detection techniques using open source information available on the Internet is broadly suggested in "The MiTAP System for Monitoring Reports of Disease Outbreak" (2004), by L. E. Damianos et al. As the title indicates, that article focuses on detecting biological events. Other prior art also describes techniques for event detection, but they do not describe the use of I&Ws for global event detection in the same way as the invention described in the '565 patent, or in the '397 and '160 applications.

U.S. Publication No. 2006/0230071 (Kass), identified in the '565 patent, describes an "event analysis system [that] monitors information available from both publicly and privately distributed networks of information for events that are relevant to the user's particular business concern. Those concerns are defined in a customized model of the user's organization and external business environment." Kass et al. describes an event model based on root-cause analysis (in FIG. 3 of the '565 patent, the root has three branches—products, organization, and society). A new ad campaign, a labor dispute, and a stock price change are given as examples of organization-centered events. Environmental changes or demographic changes are given as examples of society-centered events. A product recall, a manufacturing difficulty that affects a product, and a rebate on a product are given as examples of product-centered events. The termination of each root branch is called a "leaf" node, and they are associated with "expressions" which help the system determine if article text includes an event of the event type represented in a leaf node. So-called "tags" are used to specify text strings or variables which the event analysis system uses to detect events which match the event type. Example text string tags are date, time, tense, and confidence, and variable tags may be dollar values.

In Kass et al. events are detected from information sources. The system uses an information source model to "establish, define, or otherwise identify information sources," such as domain names (e.g., "news.abcbnewspaper.com"), identifiers (e.g., an IP address and port number), or other identifiers to specify information sources which the event analysis system will monitor. The event analysis system then retrieves information, such as news articles, blog entries, web site content, and electronic documents from those sources. In particular, an event processing control program "scans the information sources 116" and retrieves new articles, filters them, and initiates the event detection engine, which processes each filtered article to identify events. Scanning is apparently done using the "tags" as described above, but Kass et al. does not appear to describe how it filters the information, only that filters are used to remove articles not relevant as indicated in the environment model 130. The environment model defines entities and the relationships between entities.

U.S. Publication No. 2008/0319942 (Courdy et al.) teaches a method of searching a database of known patient records, identifying one or more patients from the database, entering the selected patient into a specific group (such as a cancer group), and allowing a user to manually enter updated patient information into that patient's record. The invention is discussed in connection with a browser-based "medical research system." FIG. 1 relates to a "HCI Cancer Clinical Research." Most of the figures in the patent show various templates and data entry forms that a user can use to enter data about patients, pathological samples, test results, and the like, and forms for changing or tailoring the templates and data entry forms (e.g., to add more entry fields).

FIG. 3 of Courdy et al. shows a data entry form having a "Medical Event Type" drop-down menu. On FIG. 5, there is shown a series of search entry fields (i.e., text-based fields, drop down menus, and the like). One portion of the template shown in FIG. 5 includes, under the heading "Medical Event Parameters," a field for entering an "Event Type," "Start Date," and "End Date" (unlabelled). A larger text field box titled "Extended Attributes" is also shown. In FIG. 6, a "patient update window" is shown, which includes a drop down menu entitled "Select a Medical Event Type"; next to the menu is a selectable button labeled "Link Selected as Medical Event." In various other figures, events are shown as being things like "surgery," "tumor biopsy," "surgical revision," etc., suggesting they are known, actual events related to patients.

U.S. Patent Pub. 2008-0027749 (Myers et al.) discloses a travel event report, called a Travel Information Report (TIR), having four major sections: Pre-Trip Information, Destination Information (for one or more destinations), General Advice, and Products and Services. The Pre-Trip section is described as including travel categories including Alerts, Entry/Exit Requirements, and Pre-Trip Health considerations. Alerts may include, but are not limited to, Safety/Security, Weather, and Transportation. The Pre-Trip Health section is described as also including information about immunizations, health risks, and the like. One of the travel categories is described as "Social Customs," and includes information about "Public Holidays & Events." The TIR is also described as including "a rating (such as from 1 to 5 in tenth increments, for example), which is a weighted-average of the total risk of the trip represented by the TIR as determined by criteria applied to the travel data in the TIR. This rating can be illustrated, for example, by a series of "jet" graphics printed on the TIR." Another embodiment is described where a company's assets are analyzed relative to a known "intelligence event." Myers et al. further describes an information aggregator that collects all information for a travel destination (geographical location) and then summarizes the information in a report for the destination using categories along with an overall risk rating for the destination.

Other references that disclose aspects of event detection are summarized in the support document filed by the applicants in the Patent Office in connection with the '565 patent.

SUMMARY OF THE INVENTION

The present invention is a new approach to the invention disclosed and claimed in the above-mentioned '565 patent and co-pending applications, including in U.S. patent application Ser. No. 13/090,742 ("the '742 application"), which is also co-owned by Georgetown University. The claims of the '565 patent relate to a method for communicating event information, which may include the steps of: (1) storing at a first server at least one parameter for each of a plurality of I&Ws associated with an event; (2) identifying at least one information source at a second server comprising downloadable data; (3) downloading the data at the end of a predetermined time period; (4) filtering the downloaded data at the first server to identify a subset of the data comprising the at least one parameter; (5) storing an event report comprising a descriptive summary of the subset of the data and a first scale value selected from a range of scale values for describing a severity of the event; (6) and providing at least a portion of the event report over a communications network. The '397 application includes claims directed to a system for implementing the method described above, and in particular includes claims directed to a system for detecting and communicating event-related information using, for example, (1) an information collection and processing subsystem including at least one repository database containing a plurality of document files; (2) an information analysis and reporting subsystem including an index of parameters, wherein each of the parameters is associated with one or more of a plurality of I&Ws, and wherein the one or more of a plurality of I&Ws is associated with an event; and (3) an information communications subsystem including a display module for displaying event-related information. The claims of the '742 patent involve the use of code words to transform or append data or information to the information downloaded from information sources as a way of making unstructured data more structured (and for other purposes).

The present invention is the culmination of several years of continuous system improvements and methodology developments related to the original surveillance system described in the '565 patent and '397 application. The present invention includes an improved surveillance methodology, workflow analysis, and reporting environment shown and described herein.

In particular, the present invention includes a system that facilitates the searching, analysis, and reporting of relevant I&Ws of events as part of Georgetown University's open source surveillance program called Argus. Argus has been used to monitor open-source, text-based, vernacular-language media around the globe for I&Ws of infectious disease and associated social disruption as outlined by a biosurveillance taxonomy. It was used to produce short analytical reports that highlight those I&Ws and to provide semi-structured data about the reported events. Information has been proactively disseminated by Argus to a diversified user community that consists of hundreds of Federal, state, and local entities, many of which have direct affiliation with the Intelligence Community (IC) or have vested national security interests.

In the past several years, the Argus system has been used to execute an R&D pilot study monitoring open-source, text-based, vernacular-language media round the globe for I&Ws of civil violence and political instability as outlined by an ontologically-based taxonomy. Using a process called semantic coding, in which I&Ws are translated into subject-verb-object triples (or larger groups) and associated metadata, the pilot study produced highly structured data about the reported events and often supplemented that data with short, supportive text. Through retrospective, real-time, and prospective case studies, internal and external experts have validated and verified both approaches for accuracy, timeliness, and relevancy of data.

The present invention, called AWARE (Argus Workflow Analysis Reporting Environment), includes several new key features. The improved system not only incorporates previous enhancements, but it uses enhanced processing technology that both supports semantic coding, tagging, and ingests social media, audio, and video. That approach to capturing I&Ws results in structured data that, when combined with enhanced visualization and analytical technology, serves as the basis for a new set of more analytically robust products that meet a broad range of end user needs compared to products available from the Argus system. The approach is scalable to new domains because it is efficient. It allows for baseline I&Ws to be consistently captured without having to invest in the time-consuming process of writing a long, free-text, unstructured analytical report.

Some key aspects of the present invention include:

(1) Documents are grouped based on topic and location relevant to reporting requirements for a threat domain. Techniques for achieving that grouping include, but are not limited to:
  a) Topic definition based on concepts defined in the Argus multilingual I&Ws event ontology,
  b) Boolean concept searches with proximity rules,
  c) Event location extraction using entity extraction and source location if the source is local,
  d) Automatic removal of duplicate document matched to different topics—keeping only the matched document associated with highest priority topic, and
  e) Article prioritization trained on documents relevant to a specific language, region, and threat domain.

(2) Documents are grouped by topic and pushed to a user based on relevancy with respect to the user's language and regional expertise;

(3) Documents are manually tagged by tagging the text through text selection via a dropdown list popup over selected text, thus associating the native terms with a concept defined in the multilingual Argus event ontology, which allows the event ontology to be automatically updated with new terms, leading to improved topic match in addition to semantic code extraction after coding; and (4) Documents are automatically tagged by tagging text with the associated semantic code based on concept and relationship defined in the multilingual Argus event ontology.

As in the basic surveillance system and method, a principal object of the present invention is to provide an operational surveillance capability. Other objects of the present invention include (in no particular order of importance or relevance):

(1) Providing a global event detection and tracking capability that provides early warnings of events, and estimations of the probabilities of such events escalating;

(2) Using manual and automated computerized techniques for collecting electronic information relating to social disruption, by looking for specific I&Ws, and then analyzing the collected information;

(3) Using grounded sociological theory to develop a set of I&Ws of social disruption illustrating the dynamic properties of each type of social response over time;

(4) Monitoring the changes in I&Ws over time;

(5) Using manual and automated computerized techniques for identifying and collecting temporally dynamic social disruption evidence and ranking or defining the evidence by degrees, classifications, or categories;

(6) Employing various models to characterize an event by severity, type, degree, distribution, location, or other characteristics;

(7) Providing I&Ws profiles using a sample size that is appropriate for gauging social disruption induced by various events over time;

(8) Providing a model that allows for upgraded and downgraded descriptions of an event on adynamic basis;

(9) Using categories of recurrence, elevation, and diversification, along with proper contextualization of I&Ws, to allow for more precise categorization of an event;

(10) Facilitating linking progressive warnings of events with prompt, appropriately coordinated response decisions by response officials or end users;

(11) Providing, in addition to the above-mentioned models for describing and classifying events, a higher level of assessment of events;

(12) Providing a system and method for early event detection with high sensitivity of event tracking, which includes monitoring countermeasure efficacy and issuing actionable advisories;

(13) Detecting agent events that can compromise/collapse infrastructure, such as healthcare delivery infrastructure;

(14) Monitoring and assessing an event site in terms of its connectivity to the United States by air flights and commerce trade, which may facilitate the spread of an event globally;

(15) Facilitating coupling the detection and forecasting capabilities of the present surveillance system with the collection of ground truth evidence by others, such as end users;

(16) Identifying evidence indicating that containment of an event has been lost;

(17) Providing the capability to monitor thousands of validated open sources providing coverage in all recognized countries or regions around the globe in multiple languages within an online information harvesting engine;

(18) Verifying open source information containing or reflecting I&Ws of events;

(19) Providing a system for communicating to end-users specific or summary local- and country-level reports along with assigned stratified social disruption alert levels or descriptions, which may be used by others for developing actionable decisions;

(20) Communicating information about biological events for biodefense purposes;

(21) Providing a scalable system that can be adapted to adding additional servers and interface programs to accommodate increasing amounts of documents collected from information sources, as well as to accommodate more analysts running more and more queries, and to allow increasing numbers of end users/customers with access to the system;

(22) Disseminating information to end users, providing a multi-lingual search engine, providing machine and manual translation support, providing an input to allow users to annotate collected articles, providing a routine to categorize collected articles, providing an integration platform that ties the above features together, and to allow for special data fees and collection methods on an ad hoc basis;

(23) Applying the surveillance capabilities of the invention for use by government, corporate, insurance, financial, commodities, and investment entities, as well as to provide situational awareness of the public and private markets in which those entities operate; and

(24) Using open source information to support the identification, tracking, and early warning of events within a compressed time frame of outbreaks of emerging threats.

The '565 patent and the '397 application, which are incorporated herein by reference, provide additional descriptions of each of the above objects and the advantages of the present invention.

Some of the advantages of the present invention compared to its predecessor include, but are not limited to:

(1) Maximizing analyst productivity by pushing only documents that are relevant to user's regional expert;

(2) Providing a fuller analysis of the ongoing event by grouping the documents with similar topics, allowing related document to be viewed together, and (3) Reducing reporting time through automatic extraction of semantic code from relevant documents via the multilingual Argus event ontology.

Since the filing of International Application PCT/US11/59594 on Nov. 7, 2011, assignee has continued to further develop the present invention, to include additional functionality and a user interface described herein.

Briefly described, those and other objects and features of the present invention are accomplished, as embodied and fully described herein, by a computer-aided system for detecting and communicating event-related information, the system having an information collection subsystem for downloading documents from information sources; an information storage and archive subsystem for storing the downloaded documents, one or more user-provided parameters, and at least one parameter based on indications and warnings, the indications and warnings being indicative of an event type; an information tagging subsystem for receiving user-provided inputs, wherein the inputs are selectable from within the documents and appended to the documents; an information analysis subsystem for identifying one or more of the appended documents containing the at least one parameter and storing a summary report based on the identified documents; and an information communications subsystem for receiving the summary report and transmitting or providing the summary report to a user based on the one or more user-provided parameters.

The objects and features of the present invention are also accomplished, as embodied and fully described herein, by a method for detecting and communicating event-related information, the method including the steps of: automatically downloading documents from one or more information sources containing parameters based on indications and warnings of a specific type of event; identify relevant indications and warnings in the downloaded documents based on the presence of the parameters or one or more keywords in the documents; displaying the documents containing the relevant indications and warnings; tagging the documents with additional information selected by a user from a menu within the document; aggregating information from the documents based on their relevance to the event and storing a summary report based on the aggregated information; and outputting the summary report to a broadcast subsystem based on one or more user preferences.

BRIEF DESCRIPTION OF THE SEVERAL VIEWS OF THE DRAWING

Those and other objects, advantages, and features of the invention and of various embodiments thereof will become more readily apparent from the following detailed description when read together with the following drawings, in which.

DETAILED DESCRIPTION OF THE PREFERRED EMBODIMENTS

Figure 1:
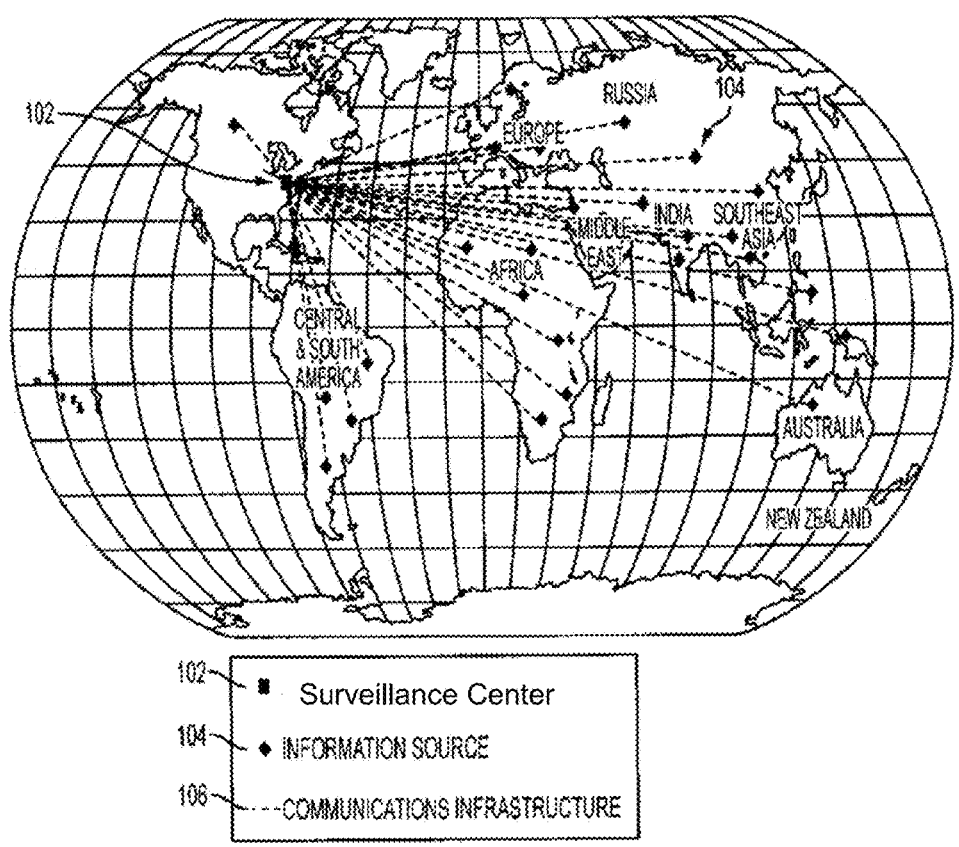
FIG. 1 is schematic drawing showing an operational overview of the preferred embodiments of the present invention.

Preferred embodiments of the invention will be set forth in detail with reference to the drawings, in which like reference numerals refer to like elements or steps throughout. Several preferred embodiments of the invention are described for illustrative purposes, it being understood that the invention may be embodied in other forms not specifically shown in any drawings submitted herewith or described below. The system and method of the present invention are illustrated with regard to certain types of events; however, the invention is equally useful for many types of events that have social disruption potential and that can be detected using various I&Ws contained in open source (or other) documents. For example, the invention may be useful for, among other things, detecting and monitoring political, economic, industrial, and environmental, civil unrest (dislocation, riots, violence against property or people); natural disasters; natural resource exploitation; and military activity, among others.

The present invention was developed using custom and off-the-shelf software and a mixture of suitable hardware devices. A combination of software products was used, including Java2/J2EE (for enterprise software development), CruiseControl (for continuous integration and server build), Perl (for system scripts, web crawling control, and automation functions), Selenium (for automated software testing), VMWare Esxi (for environment visualization), Red Hat Enterprise Linux 5 (RHEL5) (for server operation), Microsoft Windows Server 2003/2008 (for an alternative server operation), MySQL (for database management), Kapow (for web crawling and web analytics), and Tomcat (for web application server). Various Microsoft Office products were used for documentation, information analysis, and system architecture diagramming. (Some of the above software product names are trademarks owned by the respective companies that provide those products.)

Turning now to FIG. 1, shown therein is an operational overview, which involves an information collection center 102, a communications infrastructure 106, and a plurality of information sources 104 around the world. The information collection center 102 may be a single facility within or outside the U.S., or multiple facilities scattered across or outside the U.S. operating together or independently and each operatively connected to each other via one or more communications networks (not shown).

The information collection center 102 receives and examines a continuous stream of information and/or data being generated over a communications infrastructure 106, which, as illustrated in FIG. 1, is represented by individual communications links between the information collection center 102 and the information sources 104. For purposes of this detailed description, the information and data are generally news articles in the form of web document files, such as XML, HTML, ASP, or other compatible file types (see discussion below concerning potentially incompatible file types). Essentially, any open source document, listserve, thread, email, database, etc., is a potential information source 104.

The communications infrastructure 106 includes a communications network, such as a packet- or circuit-switched network, that is capable of transmitting information and data of any kind. The Internet is the preferred communications network for the present invention, although those skilled in the art who have reviewed the present disclosure will readily appreciate that other networks can be used in addition or instead.

The information sources 104 shown in FIG. 1 are identified by reference to individual cities, countries, and/or regions where the data originate. There is no geographic or other restriction on where information sources 104 may be located, or where the information and data published or provided by those information sources 104 originate (the actual information and data may originate at the site of the information source 104, or remote from the information source 104). Although FIG. 1 suggests that information sources 104 are located at land surfaces, it is also possible that information sources 104 may be associated with aircraft and spacecraft platforms, as well as submarine platforms. Information sources 104 may be fixed or mobile. The information sources 104 may also be identified by reference to the source or type of information, such as news articles, web portals, really simple syndication (RSS) feeds, and blogs, to name a few.

To illustrate the relationship between the information sources 104 and the origin of information and data, assume the information and data originate at a hospital in Asia that is treating individuals that live proximate to the hospital. Reports of increased hospital visits are broadcast on a website published by a news reporting service in the same city as the hospital in that country's native language. The website is hosted by an Internet Service Provider (ISP) with web servers located in a city 100 miles from the city where the hospital is located. Under that scenario, the information source 104 is the news reporting service website (or, more accurately, the web server that stores the actual website files containing the reported information), although the origin of the information and data is the hospital.

The information and data in news articles or other formats are captured primarily from web sites, as described above, and then formatted into a common encoding representation (typically extensible markup language (XML) or other files), indexed for rapid query access, and stored in an article repository database, as described below.

Figure 2:
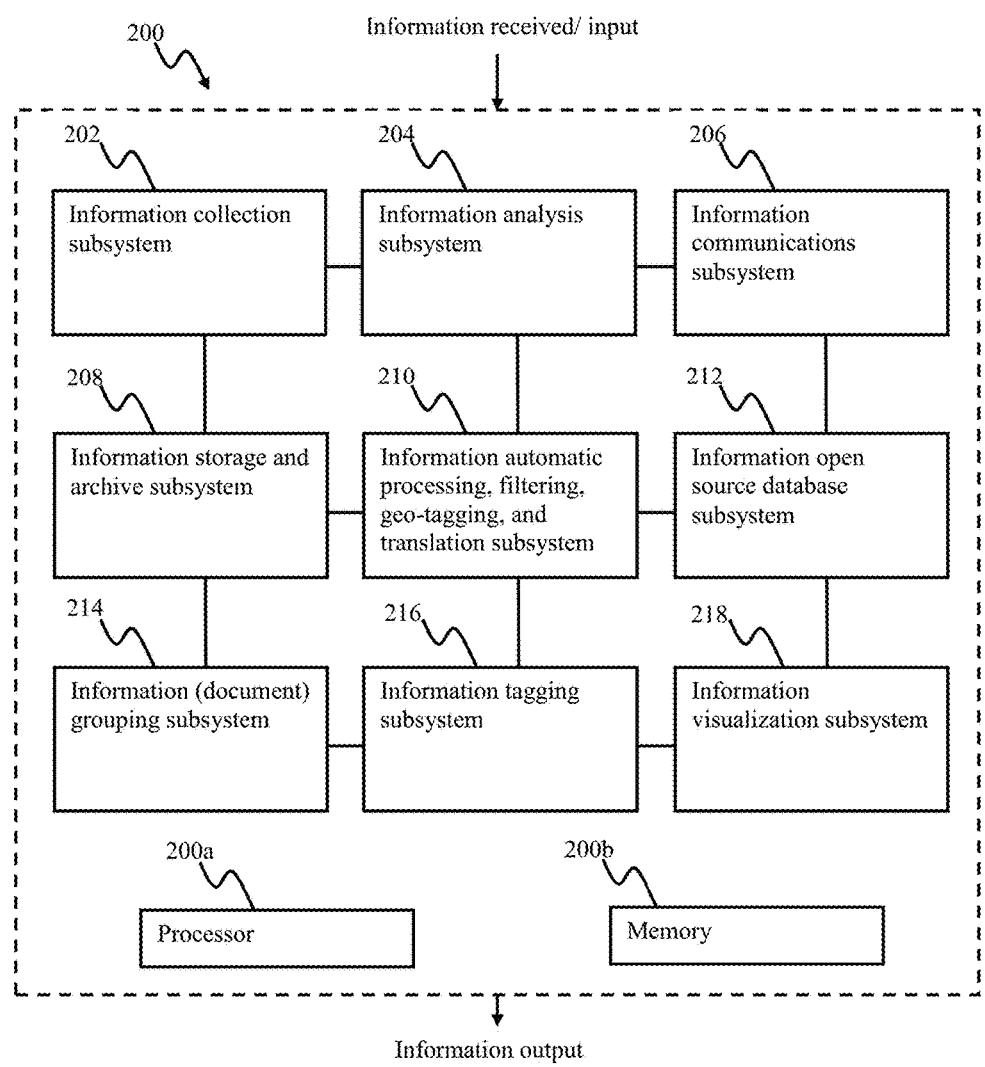
FIG. 2 is schematic block diagram showing the subsystems of the preferred embodiments relative to the inputs and outputs.

Turning now to FIG. 2, shown therein is a schematic drawing of the basic interrelated and interconnected subsystems of the overall system 200. The input to the system 200 is information (data) described above, which is pulled or pushed from information sources 104, as well as inputs from human analysts that interface with the system 200 (described below). The inputs may be one or multiple inputs connecting the information collection center 102 to one or more information sources 104. The outputs from the system 200 are, for example, various formatted reports and visual aids for communicating event-related information to end users, or the outputs may simply be raw or processed event-related information and data from the information sources 104. The above and other subsystems can be implemented on any suitable hardware, such as one or more processors 200a and one more persistent memories 200b storing code that, when executed on the one or more processors 200a, implements the subsystems.

The inputted information received from information sources 104 is processed, stored, analyzed, and outputted using various subsystems of the system 200. The subsystems include an information collection subsystem 202, information analysis subsystem 204, information communications subsystem 206, information storage and archive subsystem 208, information automatic processing, filtering, geo-tagging, and translation subsystem 210, information open source database subsystem 212, information (document) grouping subsystem 214, information tagging subsystem 216, and information visualization subsystem 218. Is summary, those subsystems are involved in facilitating automated scraping of articles on the Internet, detection of (near) duplicate articles and clustering of "similar" articles, indexing of the gathered documents for efficient retrieval, machine translation of foreign languages into English, ontology-based semantic search, filtering/ranking of articles, information extraction such as named entity and event detection, and, finally event tracking and analysis.

Information Collection Subsystem

The information collection subsystem 202 provides for downloading information from traditional text-based sources, but also from new source types and media, including social media, audio, and video sources. The information collection subsystem 202 captures information from new media sources, including audio, video, blogs, and social media, as well as standard text-based Internet media information. In particular, information (which includes data) may be obtained from social media networking sites, such as Facebook and Twitter, blogs, Google resources, RSS feeds, news alerts, news aggregators, and specialized search engines, and multilingual Internet broadcast news, such as YouTube.

An event-based ontology is first developed that dictates the structure of threat-domain-specific taxonomies that are used to identify information sources 104 (i.e., open sources) and relevant information to be downloaded from those information sources 104. Threat domains may include, for example, biological threats, civil violence threats, political instability threats, and other emerging threats.

Social disruption models are used to generate taxonomies for individual domain threats, as well as multiple emerging threat domains. Social disruption models are used to identify and assess severity of potential threats to change the normal functioning of a social system. The fundamental premise lies in identifying a baseline for stability for a given threat domain and then measuring deviations from that standard over time. This necessitates developing threat domain-specific taxonomic frameworks that identify key I&Ws that may lead to changes in given local, regional, and social contexts—and then accurately capturing and recording in real time such changes when they occur. Social disruption related to different threats such as disease outbreaks and CV may share some I&Ws while other I&Ws are unique to a specific threat domain.

Threat-specific taxonomies form the basis for providing early warnings and alerts of emerging threats. Several taxonomies for biosurveillance and plant disease surveillance are described in the '742 application, and are incorporated herein by reference. I&Ws for each taxonomy may be classified broadly as direct I&Ws, indirect I&Ws, and environmental or other I&Ws. Other classifications or categories may also be used.

Taxonomies are used to generate threat-domain-specific codes that capture I&Ws from open-source media reports (coding is further described in the '742 application). Semantic coding enables the tracking of trends over time across multiple threat domains, allowing more efficient and cost-effective tracking.

Keywords based on the taxonomies are developed for searching open-source information, reporting requirements, and advisories (i.e., thematic and severity) tags.

In addition to coding downloaded information, additional information can be geo-tagged and its source and source type added to the information. The use of coding and geo-tagging provides additional structure to the information for elucidating trends and dynamically tracking events using objective parameters.

An automated document collection system utilizes Internet crawling technologies, such as those available from Kapow, to download open source contents from selected, vetted sources on the Internet in a regular and timely manner. HTML pages are parsed against the underlying document object module (DOM) structure, which allows robots to grab specific parts of a web page (typically discarding parts such as advertisements) so that only useful content is downloaded. The searching can manage open sources built on HTML, XML, JavaScript, Flash, Ajax, and those that require user login. A graphical user interface (not shown) allows for set up and maintaining crawling and data retrieval workflow rules and templates for new as well as existing information sources 104.

Information Analysis Subsystem

Figure 4:
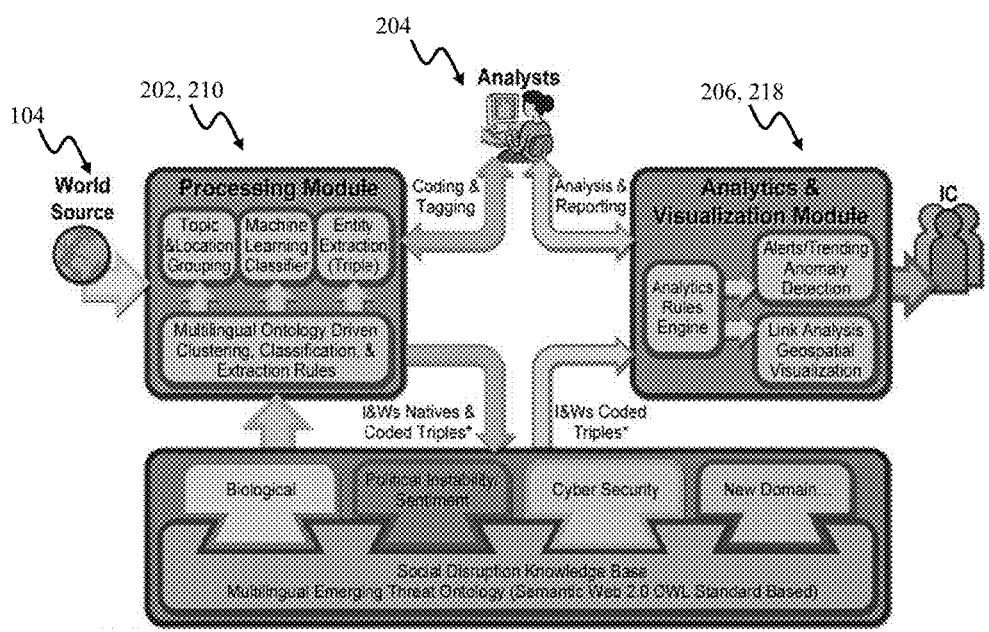
FIG. 4 is a drawing showing a workflow scheme according to the preferred embodiments.

FIG. 4 is a schematic showing a workflow. Shown therein are exemplary open source information sources 104 connected to communications infrastructure 106 (see FIG. 1). The downloaded data is managed according to the specific subsystems described herein.

The information analysis subsystem 204 involves both human analysts providing input to the system 200, and automated analytical tools. Analysts are highly trained and capable of understanding and interpreting information from local, regional, and social contexts in multiple native languages and jargons (currently more than 40 languages). These analysts have deep knowledge of the local region and social contexts of their specific countries and regions.

English- and foreign-language Boolean search strings are used, based on select I&Ws of the event-specific domain surveillance taxonomies, to drive the identification of relevant information from the information sources 104. Boolean search strings highlight phenomena related to events. The search strings are used to query internal and external search engines to identify relevant results for analysis. Keyword search strings have been refined for language, jargons and culture-specific applications.

Search strings are created from the threat-specific I&W taxonomies. Keywords are specifically designed to target relevant I&Ws, yet they are purposefully broadened not to exclude possibly relevant and related returns.

Threat-specific semantic coding of all actions and statements about past and future events in downloaded information allows the identity of threats that may be changing. The coded data may be analyzed using regression analysis, time series analysis, and hidden Markov models. These methods provide a means for quantitatively identifying conflict accelerators and de-accelerators, weighting conflict events and tracking emerging events. Similarly, thematic and severity tags (including geo-tags) can also serve as means to view and sort data based on content or topic.

Information Communications Subsystem

Figure 5:
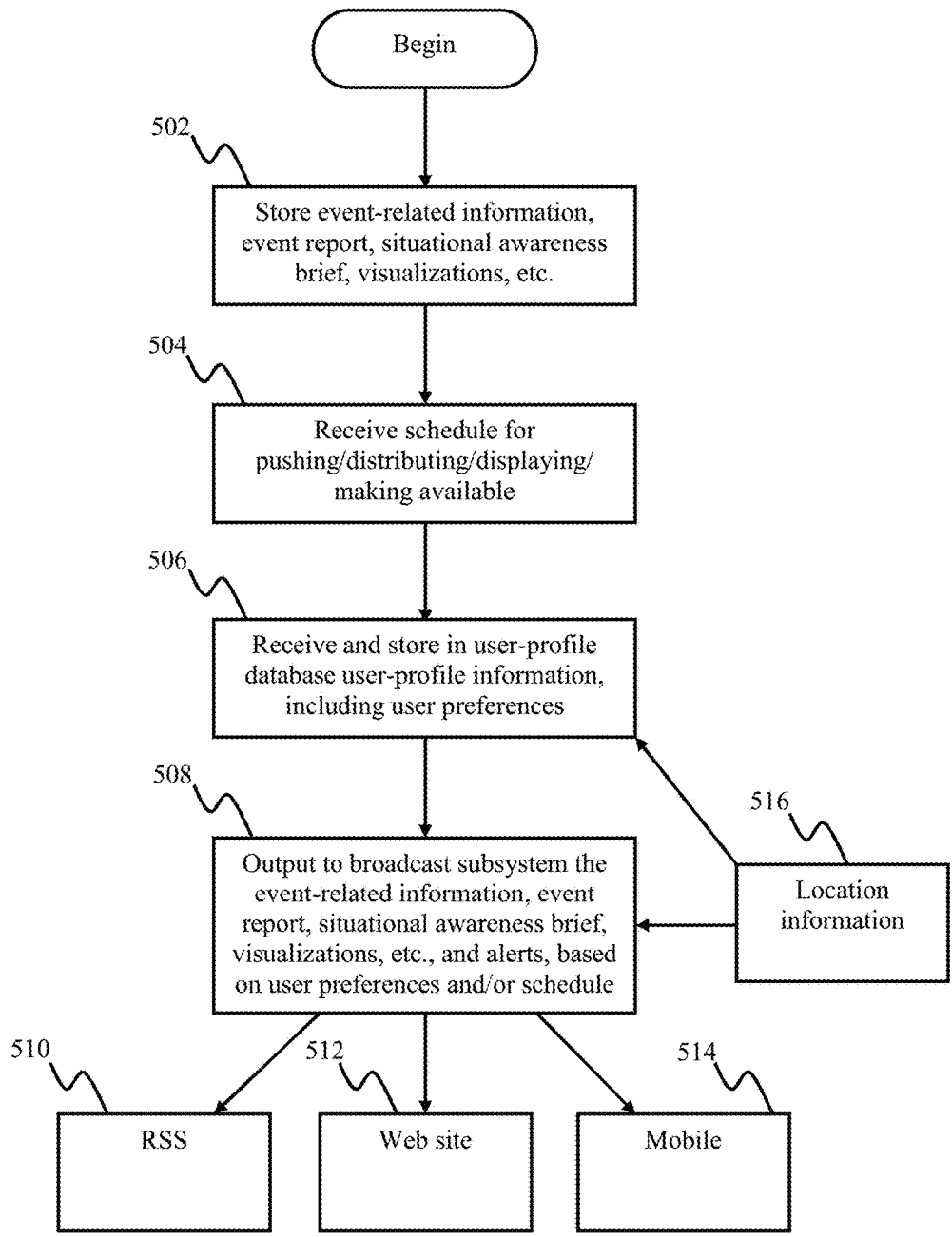
FIG. 5 is a schematic workflow diagram of a communications subsystem according to the preferred embodiments.

The information communications subsystem 206 provides for the reporting of event-related information and event analysis information. FIG. 5 is a process flow diagram for the communications subsystem 206. In step 502, information made available to end users is stored. Information may take the form of various reports, including but not limited to News Feeds, Event Reports, Situational Awareness Briefs, and Threat Assessments.

In step 504, the information communications subsystem 206 receives a schedule related to the timing of when information is pushed, distributed, displayed, made available, or otherwise transmitted to users. The schedule may include a time or time period, frequency, or other preference.

In step 506, the information communications subsystem 206 receives user preferences, which are stored in a user profile database associated with a particular user or group of users. User preferences may include the above-mentioned schedule information, a user name, access control preferences, password, account management information, information related to the user's preferred communications modality for receiving information (such as the user's mobile phone number or email address).

In step 508, the information is output to a broadcast subsystem that receives the information, formats it, and then outputs it using the designated communication modality based on the type of information and the user's preferences stored in the user profile database.

The primary mechanism for providing event-related information is a web-based, on-line portal (described below). The same portal may be used by analysts for interfacing with the system 200.

The information may be provided (pushed or pulled) to mobile devices, as well as provided as RSS feeds, e-mail, and short message service (SMS) alerts to end users. Alerts may include a hypertext link to the information related to the alerts.

A smart phone-optimized, password-protected view of the data, built with HTML 5 technology, allows users to experience the same functionalities via their mobile device (such as an iPhone, Android, or Blackberry). The mobile application leverages GPS for customized viewing based on a user's individual location. Location information may be received automatically by the broadcast subsystem and stored in the user profile database associated with each user's GPS-enabled mobile device.

Users can receive text-based products through RSS, SMS, and e-mail alerts. They can subscribe to them via the web-based portal (described below), where they can choose to receive alerts according to event location, threat domain, topic, advisory tag, and media source. Users can also choose the frequency with which they receive those alerts, such as in real time or as a daily digest. SMS and e-mail alerts allow users to jump to the mobile application to view the full text of the product.

On each of the appropriate platforms, a resident application provides users with the ability to home in on events of interest based on event location, user location, timeframe, topic, advisory tag, and media source.

The information distributed to those platforms is transmitted using any one of the communications modalities known in the art, including packet-switched networks, circuit-switched networks, wireless and wired networks, using public and proprietary communications protocols.

Information Storage and Archive Subsystem

The information storage and archive subsystem 208 involves the storage of information downloaded from information sources 104, reports, keyword search strings, and user profiles for each analyst or user of the system 200. Stored data on databases may be accessed through SharePoint and other applications. Documents are maintained through configuration management provided by SharePoint; engineering artifacts can be controlled using software such as Subversion.

The present data storage is sufficiently large to store up to several millions of media articles and information/document indices. To optimize search and retrieval, recent documents are kept on a high-speed, 15K rpm, serial attached small computer system interface (SCSI) redundant array of inexpensive disks (RAID). The remainder resides on slower 10K rpm serial ATA (AT attachment) RAID drives. The stored event reports are maintained in an SQL database. Open-source RDF Semantic Triple Store uses Jena Tuple Database (TDB), a component of the Jena inference engine.

The above-mentioned web crawlers (robots) download (scrape) information from targeted information sources 104 (sites that block crawlers by IP address are anonymously accessed using public proxies). Downloaded data is parsed with appropriate document metadata labels, including source, title, publication date, and body, and stored in the document archive on the above storage devices using an appropriate database structure.

The above-mentioned keyword search strings are stored in an internal database and integrated with the searching technologies utilized by analysts. The search strings are readily sharable among current and future system users. The keyword search strings represent the accumulated knowledge of thousands of searches run by trained linguistic and cultural experts, and trainable text search algorithms.

Information Automatic Processing, Filtering, and Translation Subsystem

The information automatic processing, filtering, and translation subsystem 210 provides for several functions.

Machine translation (MT) is used to convert non-English open source information from information sources 104 into English. The above-mentioned semantic codes are created from different languages. A machine translation gateway (MTG) provides a single point for MT services, and was designed in a way that makes it simple to incorporate new languages and services.

Information Open Source Database Subsystem

The information open source database subsystem 212 is used to maintain a current list of relevant and appropriate open sources of information and information sources 104. Each information source 104 is selected, validated, and verified as the most appropriate and relevant source of information. Information sources 104 are first identified from those with broad-scope international and multinational media, national media sources, and regional and local media sources. Vernacular, native-language local sources provide the most relevant and critical early I&Ws of events. Information sources 104 are also identified relative to geographical coverage, including those with national source scope, provinces, districts within a province, cities or towns within a district, and no on.

The following information is maintained for each information source 104: uniform resource locator (URL), name, language, country of origin, country(ies) covered, scope covered (local, regional, national, multinational, and international), type (mainstream media, public/official, and citizen journalism), medium (HTML, audio, video, blogs (whether HTML or other markup language or scripts), and social media), topic (general or threat domain-specific) and source descriptor (brief description of source). Other parameters may also be stored, including, web traffic statistics, web site-owner/-host information, audience, primary purpose of publication, format, history and frequency of publication, and political leaning.

Figure 3:
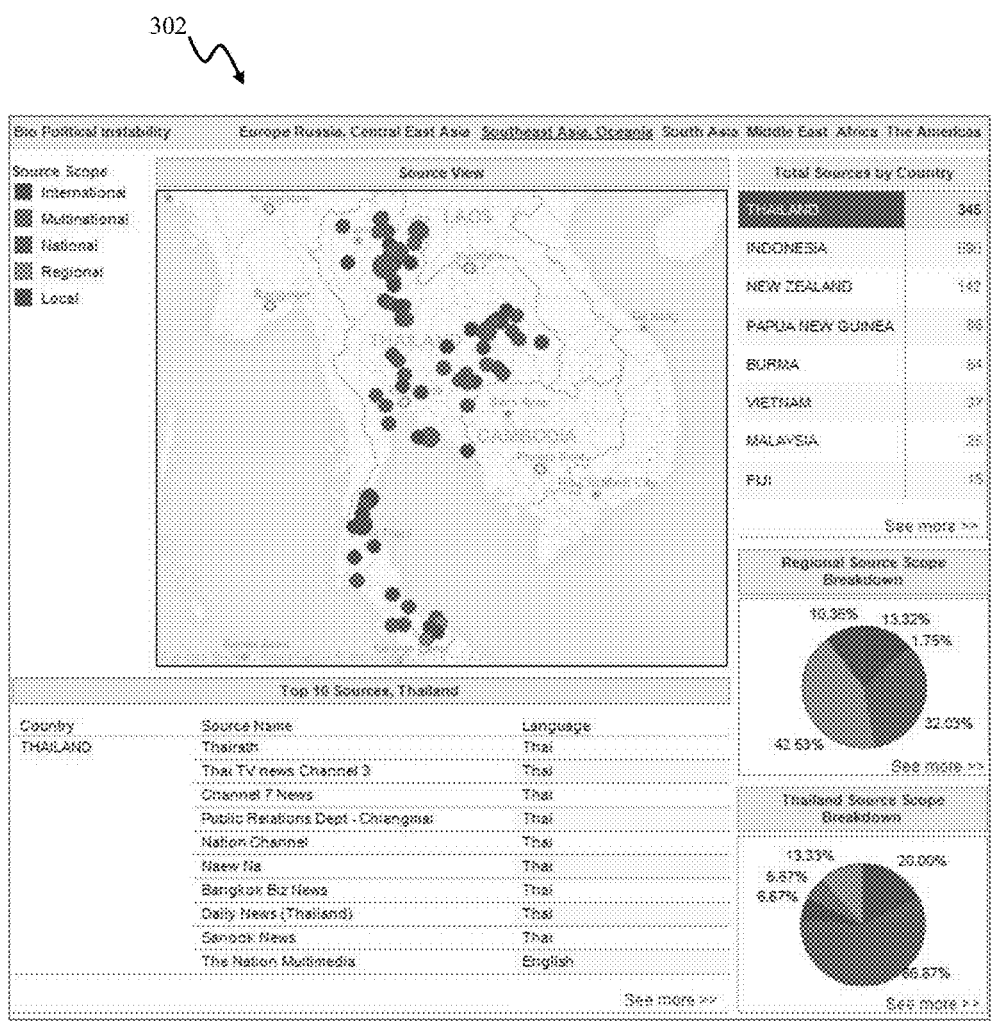
FIG. 3 is a drawing showing a screen-shot of an exemplary graphical user interface dashboard for managing information sources according to the preferred embodiments.

A dashboard program is used to input and review the above information about information sources 104, and can be used to generate statistics about the information sources 104 maintained in the open source database 212, including Total Number of Active Sources, Broken Sources, Number of Sources per Language, Number of Sources per Country, Number of Sources per Scope of Coverage: Local, National, Regional, Multinational, International, Diaspora Community, Number of Sources per Type: Mainstream Media, Public/Official, Citizen Journalism, Number of Sources per Medium: HTML, Audio, Video, Blogs, Social Media, Number of Sources per Circulation Type: Daily, Weekly, Monthly, Sporadic, and Number of Sources per Threat Domain: Biological, Political Instability. FIG. 3 is a drawing showing a screen-shot of an exemplary dashboard 302. The particular screen shot shows information sources for Thailand.

Information (Document) Grouping Subsystem

The information (document) grouping subsystem 214 includes a text classification system and a text clustering system. Documents may be grouped based on topic and location relevant to reporting requirements for a threat domain. Techniques for achieving that grouping include, but are not limited to: (1) Topic definition based on concepts defined in the Argus multilingual I&Ws event ontology, (2) Boolean concept searches with proximity rules, (3) Event location extraction using entity extraction and source location if the source is local, (4) Automatic removal of duplicate document matched to different topics—keeping only the matched document associated with highest priority topic, and (5) Article prioritization trained on documents relevant to a specific language, region, and threat domain. Documents may also be grouped by topic and pushed to a user based on relevancy with respect to the user's language and regional expertise.

The information (document) grouping subsystem 214 may also invoke classification and clustering models, which together with a duplication removal mechanism, helps facilitate prioritization (ranking) and aggregation (grouping) of documents relevant to the designated surveillance goals as well as subtopics (e.g., H1N1 outbreaks or election riots) for each analyst.

A text classification system uses the information/articles downloaded form the various information sources 104 that match a Boolean query string, retrieved from the archive through searching indexes. Information/articles belonging to different categories are identified, where a set of categories defined for individual analysts can be languages, countries, event types (e.g., diseases), etc. A classifier, using a machine learning model or combination of models (ensemble) tuned for individual analysts for each language, is then used. An example classifier is a trained perceptron algorithm. A clustering engine is used to speed access to articles. An example clustering model is the K-means clustering algorithm, which tries to divide n date points into k groups in such a way that data points in one group are very similar to each other, and data points from different groups are dissimilar.

As part of the classification and clustering of open source data, duplicates are automatically removed. Each downloaded article is considered as a vector of features with weighted normalized values. Euclidean distance or inner vector methods can be used to calculate a "distance" between two articles. Using a threshold value, $\alpha$, if the distance between two documents is less than $\alpha$, then the two documents are considered as duplicates and will be flagged as such in the archive.

Information Coding and Tagging Subsystem

The information tagging subsystem 216 provides a user input interface whereby documents may be manually tagged by tagging the text through text selection and coding via a dropdown list popup over selected text, thus associating the native terms of the document with a concept defined in the multilingual Argus event ontology, which allows the event ontology to be automatically updated with new terms, leading to improved topic match and semantic code extraction by end users. For example, in a document related to a protest, the user may point his or her cursor to the word "street" and, by right- or left-clicking on the word, open a menu, such as a drop-down menu that the user can scroll through to find and then select a pre-loaded words, phrases, or other indicia (all of which could be stored in a database and indexed or cross-referenced to the event ontology and/or event I&Ws associated with a particular event domain). Once the word/phrase/indicia is selected, it is associated with the word "street" in the document and appended to the document file as metadata. It may also be displayed in the document when the document is displayed on a graphical user interface, or it may display when the user places the cursor over the tagged word "street." The tagged word/phrase/indicia could also replace the intrinsic term "street" in the document. If the menu does not contain the desired word/phrase/indicia, the user may enter the appropriate new word/phrase/indicia, which would then be used to update the event based ontology for that particular event. Documents may also be automatically tagged by tagging text with the associated semantic code based on concept and relationship defined in the multilingual Argus event ontology, as described below.

The information tagging subsystem 216 also provides an interface to a code book database for the purposes of semantic coding of open-source data downloaded from information sources 104. Coding may be done separately from the tagging process using the above-mentioned intra-document drop-down menu. Coding converts unstructured open-source information (text) into structured data (text supplemented with text from a finite set of semantic descriptive words), The methodology includes a standard statement taxonomy (subject-verb-object-modifier) that can code all information about an event into machine-readable form. For example, the coding of a web article might result in appending the terms "international organization+confirmed+disease+x cases" under a biological threat domain, or "rebel group+attack+military" under a political instability threat domain. More particularly, an event involves different types of entities, such as a person, e.g., "Thaksin Shinawatra", or a group of people, e.g., "United Front for Democracy against Dictatorship (UDD; Red Shirts)" or "People's Alliance for Democracy (PAD; Yellow Shirts)", and also involves different types of actions, e.g., "march (to protest)" or "bomb (to protest)." A set of entities or actions forms a semantic structure, e.g., "UDD" and "PAD" are "political groups" and "march (to protest)" and "bomb (to protest)" are "protest." The coding approach utilizes standardized semantic ontologies, including Resource Description Framework (RDF) and Web Ontology Language (OWL) for all information representation and geo-tags all events using the best-case available information and local knowledge. The result is open-source information tagged by subject, verb, and object codes, and other tags that capture unique identifying details such as geo-tags and source type. This coding process produces multiple unique data points that can be interpreted, aggregated, and compared in a way that elucidates trends and tracks emerging threat events at a local level. The structured information produced is accessible through an interface that utilizes data visualization, trend analysis, information retrieval, and analytical knowledge accumulation and management. This allows analysts to identify trends and track dynamic emerging threats on a worldwide scale, extending across multiple domains.

Information Visualization Subsystem

Figure 6:
FIG. 6 is a drawing showing a screen-shot of an exemplary graphical user interface used by analysts and end users for accessing event-related information.

FIG. 6 is a screen shot of a typical home page 602 of a graphical user interface 600 for the system 200. The home page 602 includes links (tabs) 604 for "Graphical View," "News Feed & Event Report," "Daily Situational Awareness Brief," "Threat Assessment," and "Blog." On the right side and bottom left side of the home page 502 are preview windows for each of those links/tabs.

The News Feed tab and preview window on the home page 602 provides users with a feed of up-to-the-minute, individual data items (semantic codes) summarizing I&Ws in limited-character text, i.e., phrases or short sentences describing what I&Ws have appeared in a particular location. Each news feed item includes a citation for each media report on which it was based; identifies the scope of the source(s) from which it is drawn; and, if certain high-priority indicators are present, is tagged with an advisory.

The Event Reports tab and preview window on the home page 602 provide users with further information about an up-to-the-minute news feed item that is designated by reporting requirements as high priority. It is shorter than a traditional report, but still provides the details or context necessary to help the user better understand the I&Ws that are present.

The Daily Situational Awareness Brief tab and preview window provide users with a roll-up of the highest priority events in the last 24 hours, as designated by reporting requirements and senior operations staff.

The Threat Assessments tab and preview window provide users with a high-level analysis of an emerging trend, or flesh out the significance of an individual event identified in the data. The page length and speed of release of these products varies based on nature of the topic, but averages 3 to 5 pages biweekly.

The Blog posts tab and preview window provide users with a brief analysis of an emerging trend or draws out the significance of an individual event identified by the data. The Blog posts area could be a few paragraphs long and appear on a regular basis, for example, at least once a month per threat domain.

A "World Monitor" window on the home page 602 shows current events on a map, each event color coded according to a particular scheme (e.g., degree of severity, classification, threat domain, event type, actor, age, etc.).

Figure 7:
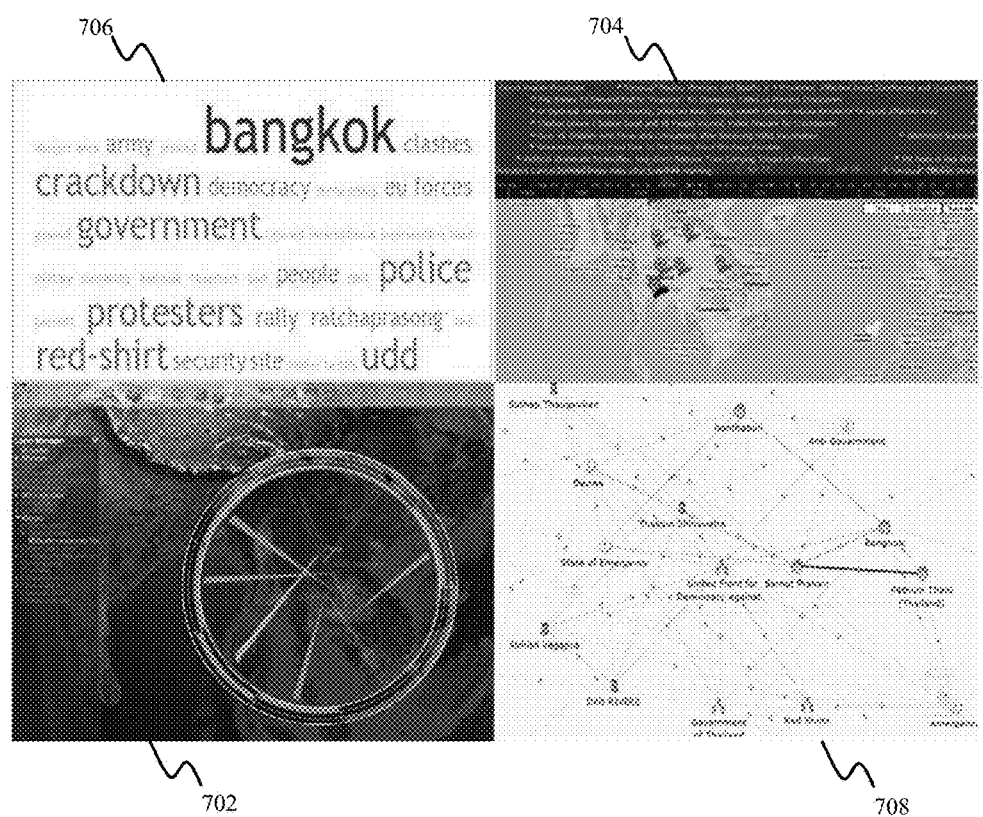
FIG. 7 is a drawing showing multiple screen-shots of the output of event-related information visualization tools according to the preferred embodiments.

The graphical user interface allows users to visualize up-to-the-minute data (including semantic codes) quantifying I&Ws, in formats such as geospatial maps 702, timelines 704, charts, graphs, tables, word clouds 706, and link analysis 708, as shown in FIG. 7.

Figure 8A:
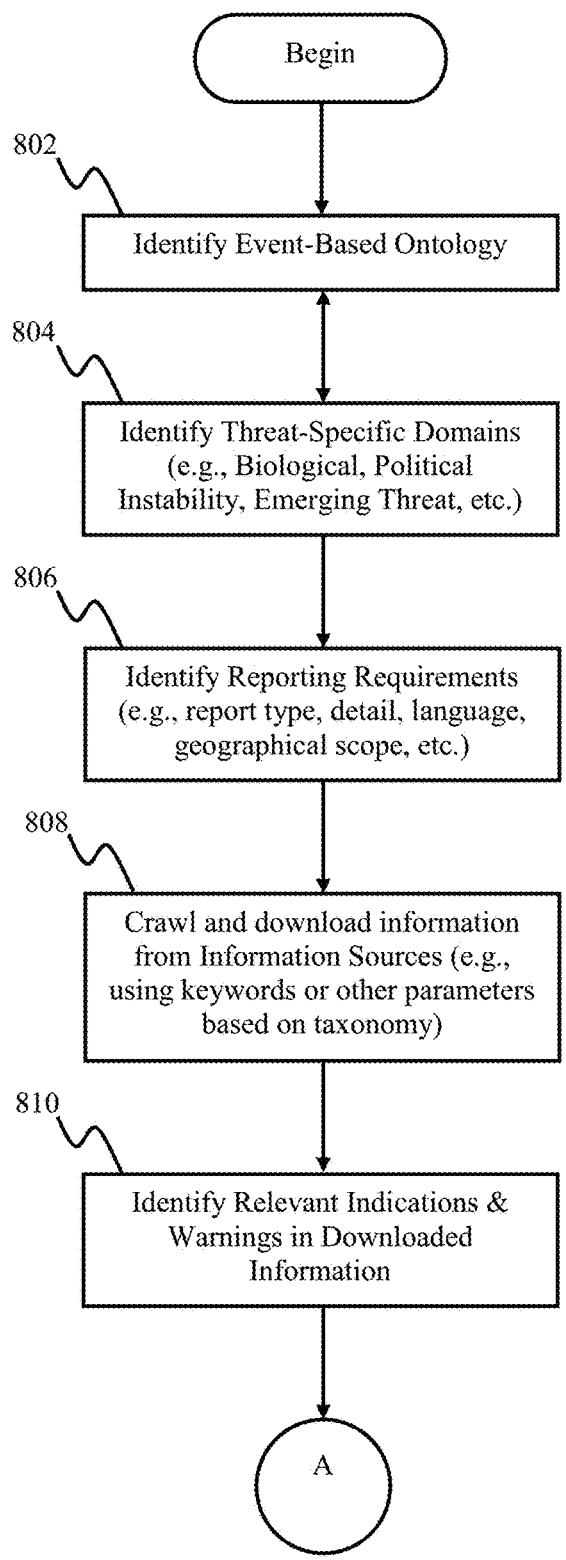
FIGS. 8A and 8B together form a schematic workflow diagram of the preferred embodiments.
Figure 8B:
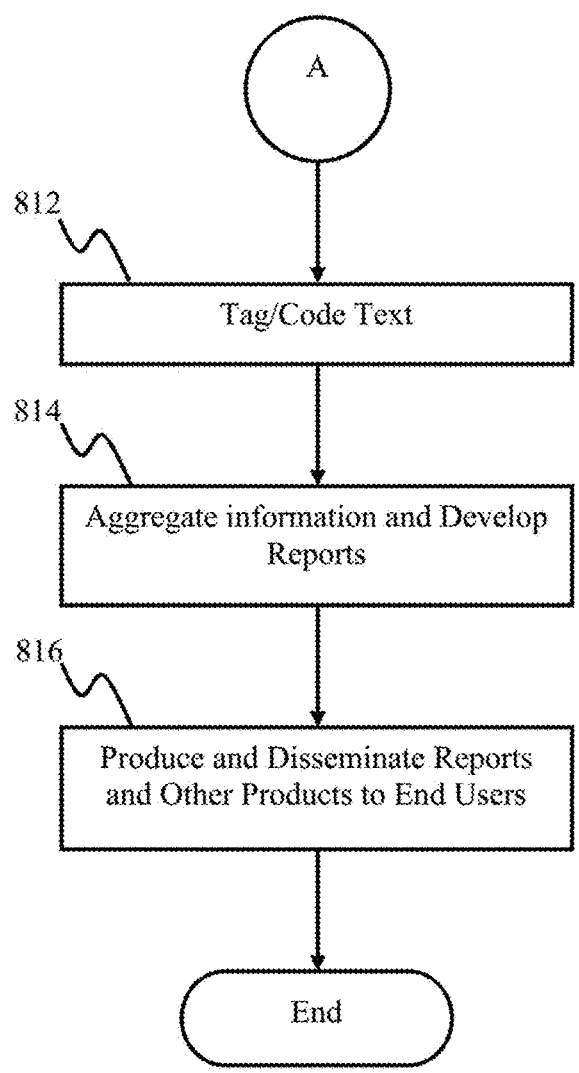

Turning now to FIGS. 8A and 8B, shown therein is a workflow diagram. In steps 802 and 804, an event-based ontology is identified in accordance with an end user's desired interest in one or more threat-specific domains (e.g., biological, political instability, emerging threat, etc.

In step 806, the specific reporting requirements desired by the user are identified. For example, the user may wish to indicate a specific report type, level of detail, type of language, and an area/geographical scope of interest. The user may also indicate a preferred communications modality (e.g., an alert sent as an email message or SMS text message to the user's smart phone or other mobile computing device).

In step 808, the system 200 invokes software to crawl information sources 104 according to a pre-determined frequency and schedule. Relevant information identified during the crawl is downloaded from each relevant information source 104. Crawling proceeds, for example, using keywords or other parameters based on indications and warnings related to a specific taxonomy, which is itself related to the event-based ontology.

Figure 9:
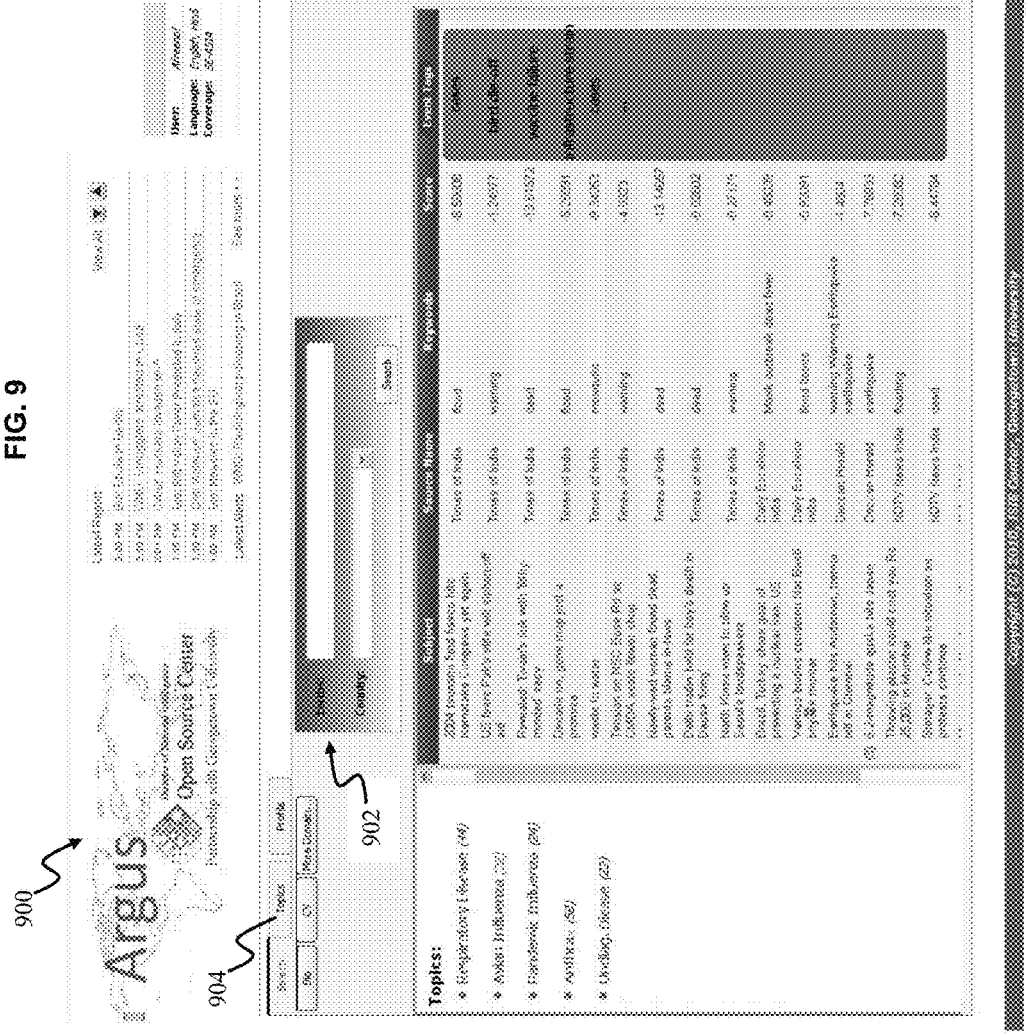
FIG. 9 is a drawing showing a screen-shot of an exemplary graphical user interface used by analysts to search an archive for relevant event-related information.

In step 810, relevant indications & warnings are identified in the downloaded information by searching for keywords or other parameters associated with the indications and warnings. That is accomplished, for example, by using the graphical user interface 900 shown in FIG. 9. The graphical user interface is preferably a website displayed using a suitable browser. A window 902 is used for entering one or more search terms, preferably in the form of a Boolean search string, which may be in any native language, and a dropdown menu provides regions of interest (e.g., a country or province). Search results are shown on the graphical user interface as a list or archived records. The list including the "Subject" of the information/stored article, the name of the information source 104 ("Source Name") from which the information was obtained, "Keywords" associated with the information, a "Score," which may indicate the relevance of the article to the keywords, event domain, or other parameter, and "Event Tags," which may be codes or other terms, phrases, or information. A "Topics" tab 904 is also displayed.

Figure 10:
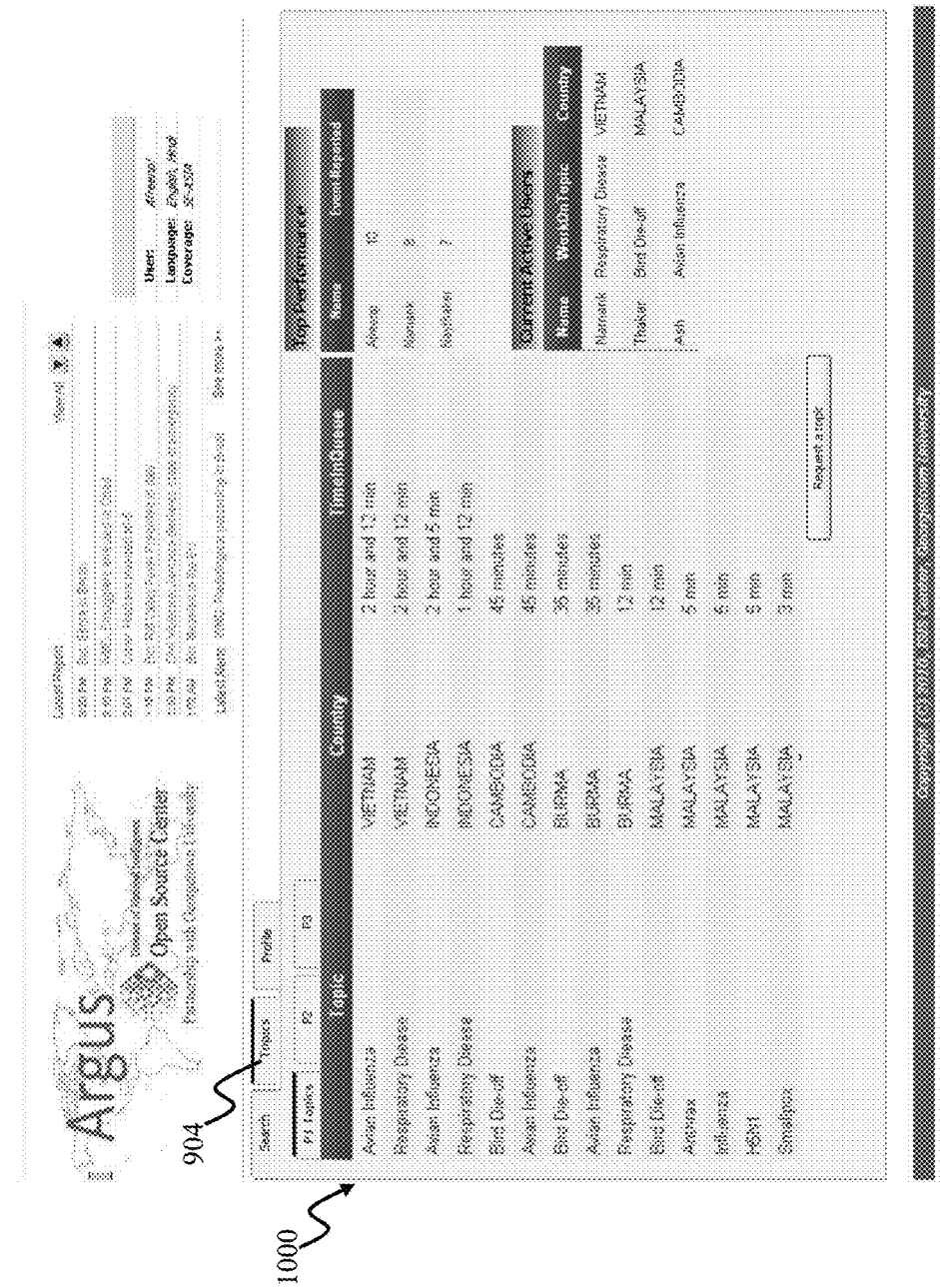
FIG. 10 is another drawing showing a screen-shot of an exemplary graphical user interface used by analysts.

FIG. 10 shows the "Topics" tab 904 of the graphical user interface 900, with one analyst's specific topics 1000 displayed.

In step 812, the relevant downloaded information, typically in the form of an open source, published article or report, is stored in the open source/archive database. The relevant downloaded article is appended with semantic codes, in the form of words, terms, data, indices of relevance and degrees of importance, and other data, which is stored with the downloaded information. Coding may be accomplished by highlighting a specific word or phrase in the information, such as the mention of a name of an individual, geographic location, or action or activity, and then selecting from a drop down menu a word, term, data, or other indicia that is then linked or associated with the highlighted word or phrase.

Figure 11:
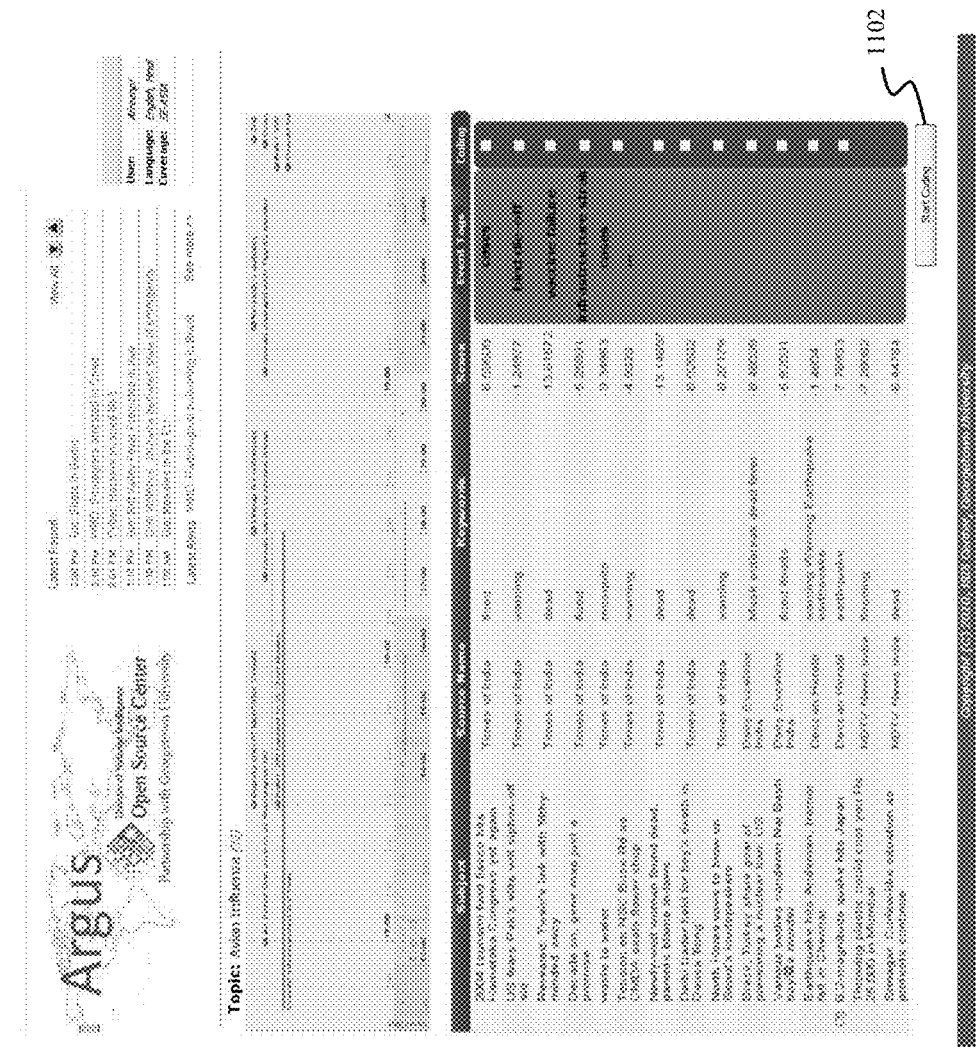
FIG. 11 is another drawing showing a screen-shot of an exemplary graphical us interface used by analysts.

FIG. 11 shows the graphical user interface 900, with information/archived articles concerning a specific event topic ("avian influenza") displayed. To the right of each listed article is a user input for indicating whether "Coding" has been performed for the article. Once selected, the user clicks the "Start Coding" button 1102 to begin the coding process. Alternatively, coding may be accomplished within the article itself using drop down menus as described previously.

Figure 12:
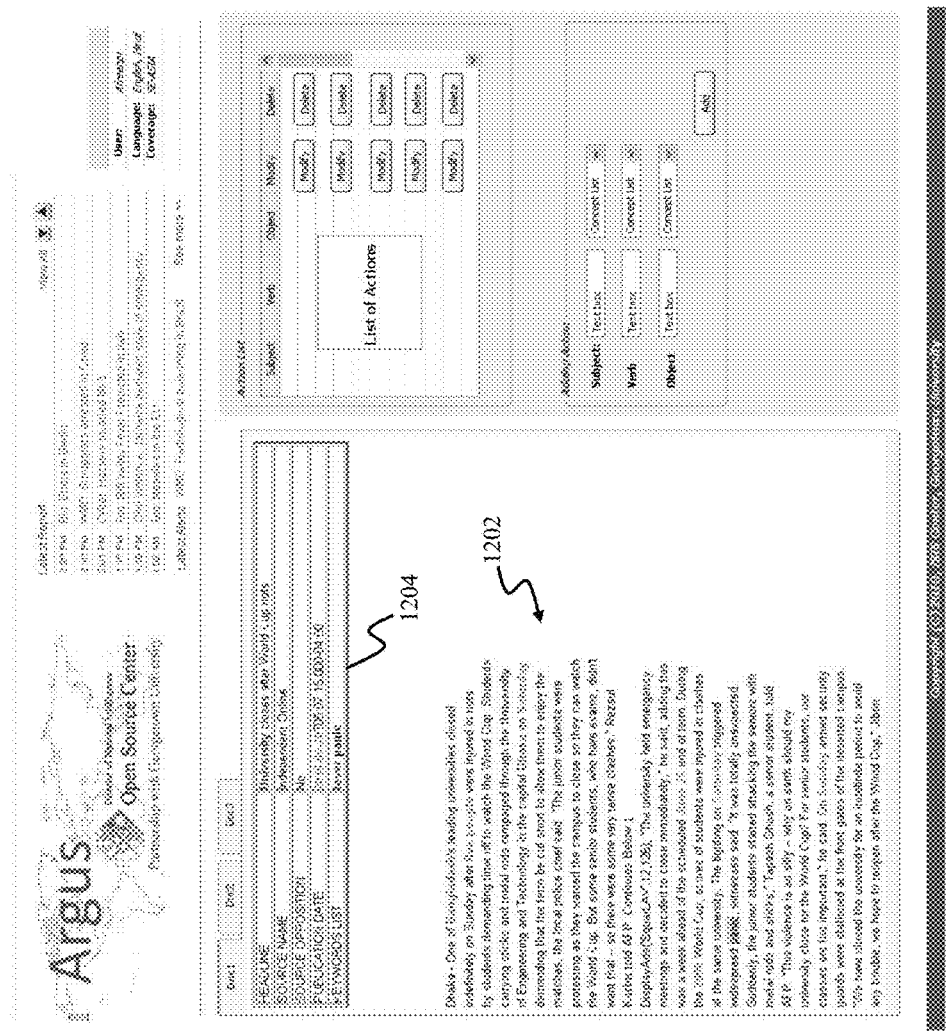
FIG. 12 is another drawing showing a screen-shot of an exemplary graphical user interface used by analysts.

FIG. 12 shows the coding page of the graphical user interface 900. As shown, three articles "Doc1," "Doc2," and "Doc3," from the archive are open. In the view shown, the "Doc1" record is displayed, including the body of the article 1202 and associated meta data 1204 (i.e., "HEADLINE," "SOURCE NAME," "SOURCE OPPOSITION," "PUBLICATION DATE," and "KEYWORD LIST"). The body of the article is highlighted with color-coded words and other indicia to indicate which words are keywords (i.e., associated with indications and warnings of an event), or have been associated with codes (e.g., "Subject," "Verb," and "Object"—the above-mentioned semantic triple). For example, the article shown includes a yellow highlighted term "panic," which is one of the two keywords shown next to "KEYWORD LIST."

In step 814, information, with the appended codes, is aggregated by analysts if it pertains to the same or similar events. An alert, report, threat assessment, brief, map or other form of communicating the information is developed by the analysts (or automatically, in accordance with specific models that are trained to look for common words or phrases in the downloaded information).

In step 816, the reports and other products are disseminated to end users in accordance with the user's preferences.

Figure 13:
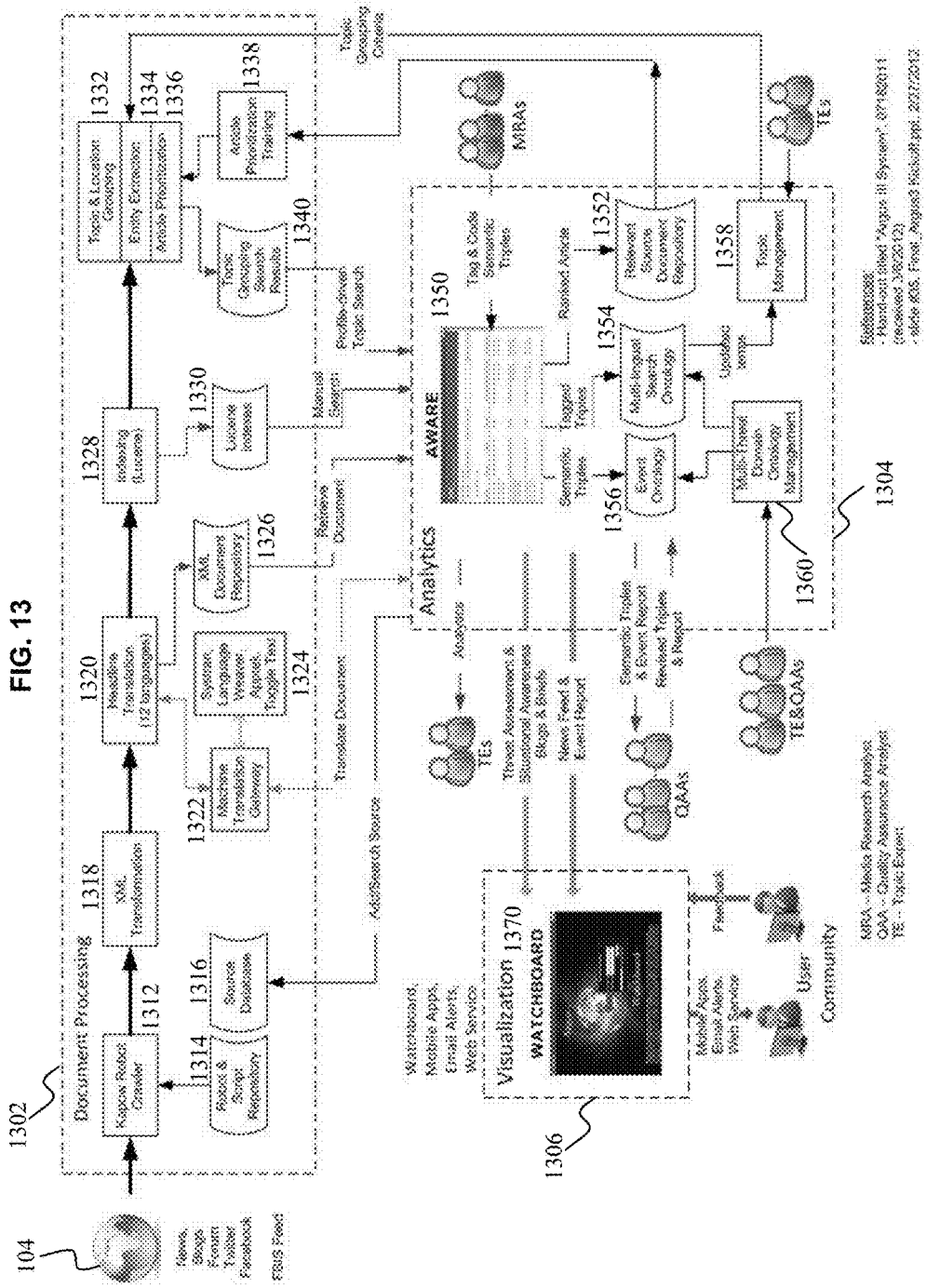
FIG. 13 is a schematic drawing showing an operational overview of another embodiment of the present invention.

Turning now to FIG. 13, shown therein is a schematic block and text diagram showing an operational overview of another embodiment of the present invention. In the figure, three subsystems are shown: Document Processing 1302, Analytics 1304, and Visualization 1306.

In the Document Processing Subsystem 1302, a Kapow robot crawler 1312 receives inputs from a robot and script repository 1314 and a source database 1316 to crawl through the data sources 104. The output goes to an XML transformation routine 1318 and thence to headline translation 1320, which works with a machine translation gateway 1322 and machine translation systems 1324. The output goes to both an XML document repository 1326 and an indexing engine 1328, the latter of which produces indexes 1330. The results of the indexing also go to topic and location grouping 1332, entity extraction 1324, and article prioritization 1326, the last of which relies on article prioritization training 1338 to produce topic grouping search results 1340.

In the Analytics Subsystem 1304, search results are supplied to AWARE 1350. Ranked articles, tagged triples, and semantic triples to go respectively to a relevant source document repository 1352, which supplies inputs to the article prioritization training 1338; a multilingual search ontology 1354, which supplies updated terms to topic management 1358; and event oncology 1356. The multilingual search ontology 1354 and the event ontology 1356 are managed by multi-threat domain ontology management 1360.

The Visualization Subsystem 1306 includes a watchboard 1370.

Figure 14:
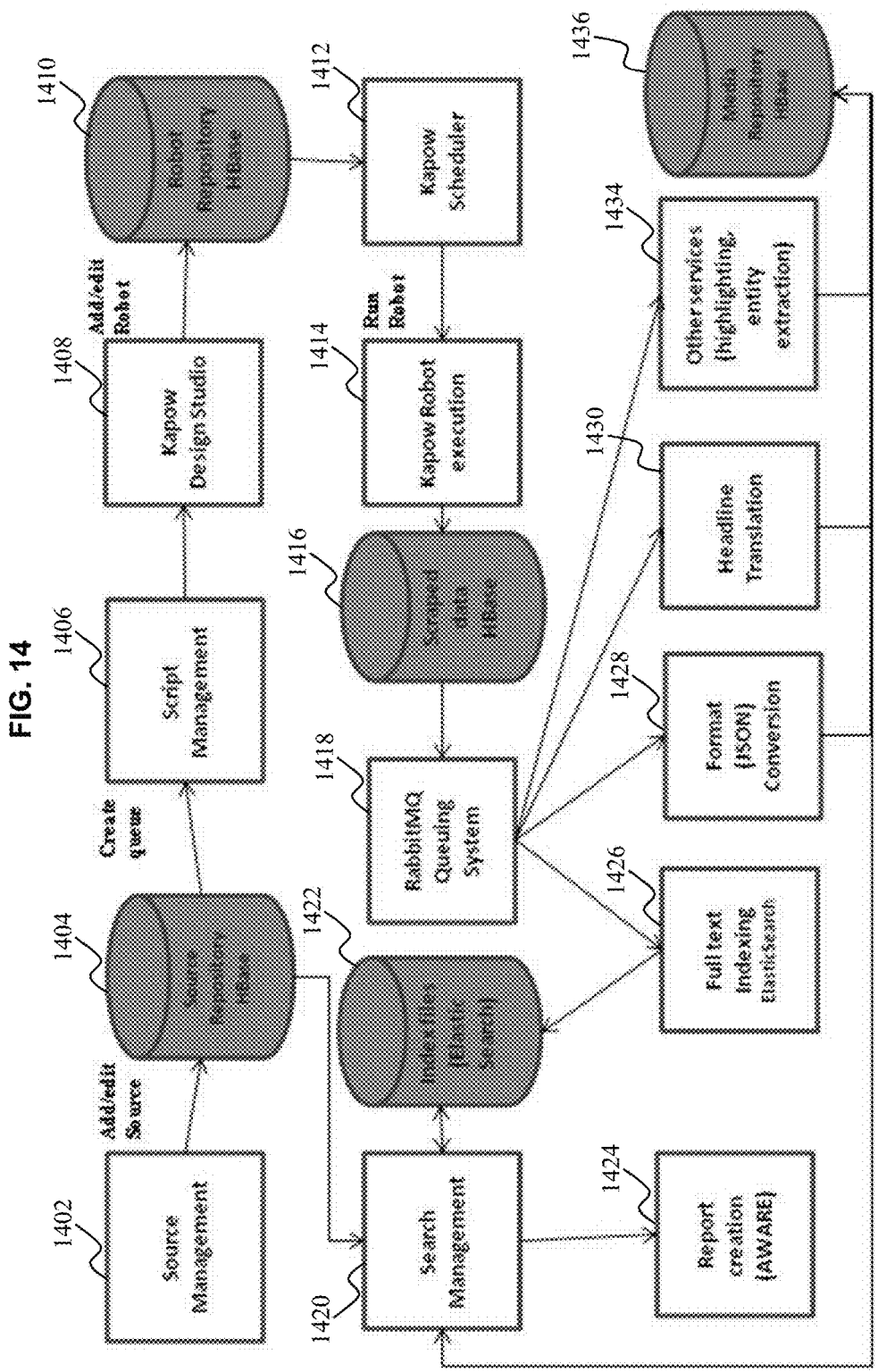
FIG. 14 is a schematic block diagram showing the subsystems of another embodiment of the present invention.

FIG. 14 is a schematic block diagram showing additional components of the system of FIG. 13. Some of the details of the subsystems and components of those subsystems are described previously and below. The components include source management 1402, a source repository HBase 1404, script management 1406, a Kapow design studio 1408, a robot repository HBase 1410, a Kapow scheduler 1412, Kapow robot execution 1414 for running the robot, a RabbitMQ queuing system 1418, search management 1420, report creation (AWARE) 1424, full-text indexing (ElasticSearch) 1426, format conversion 1428, headline translation 1430, other services 1434, and a media repository HBase 1436.

Document Processing Subsystem

Figure 15:
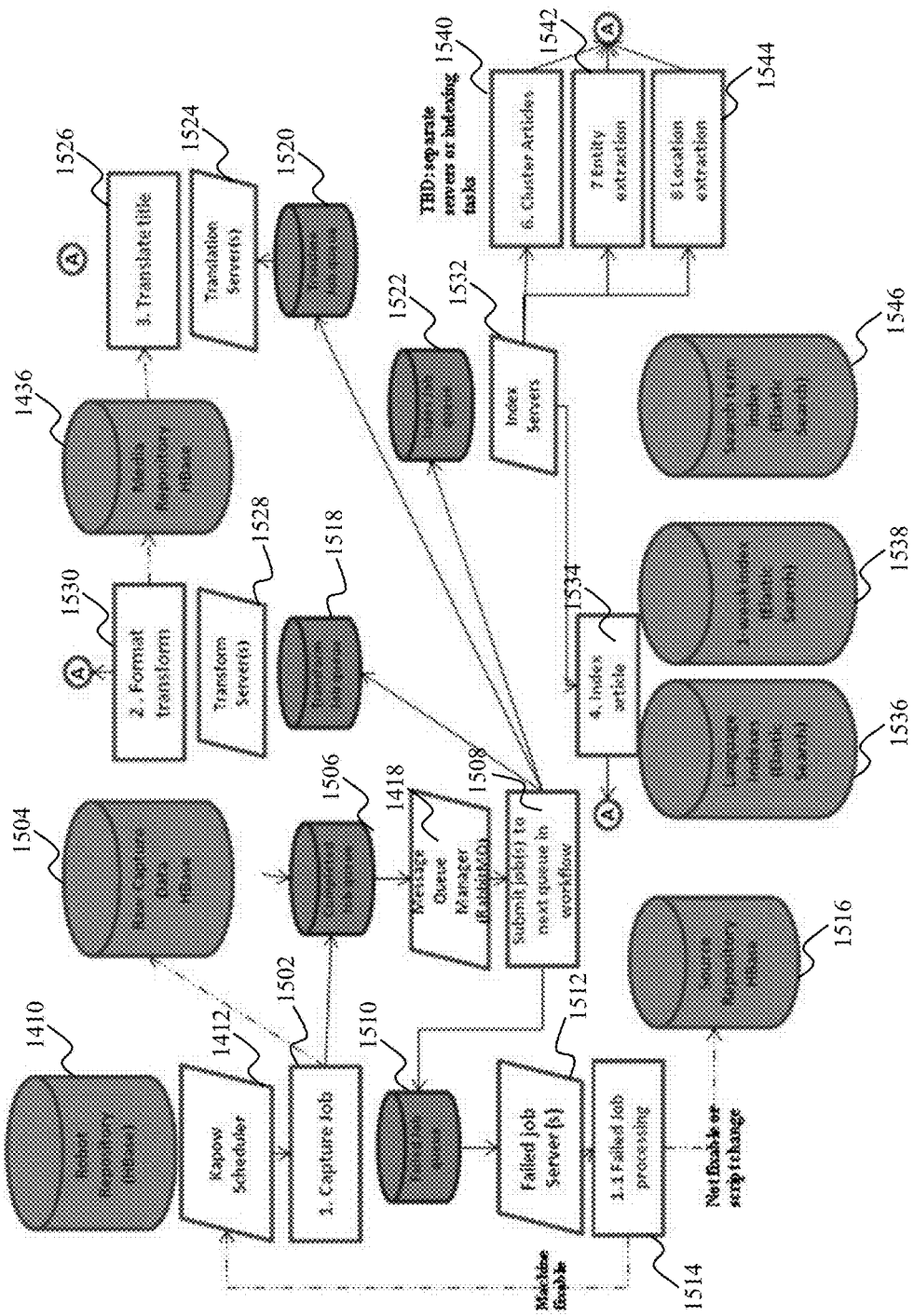
FIG. 15 is a block diagram showing the components of the information ingest and processing components according to one aspect of the present invention.
Figure 16:
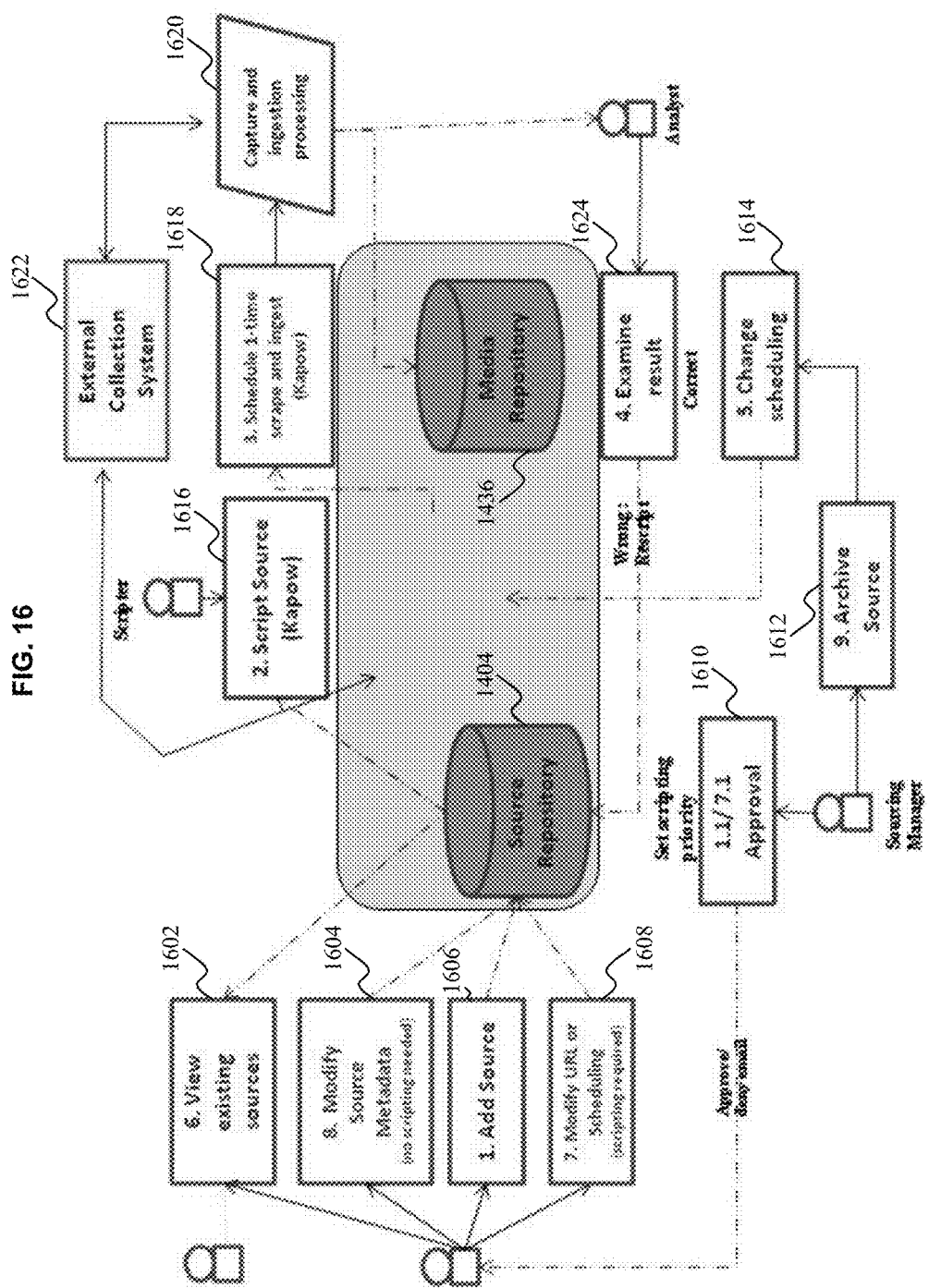
FIG. 16 is a block diagram showing the components of the source management components of one aspect of the present invention.
Figure 17:
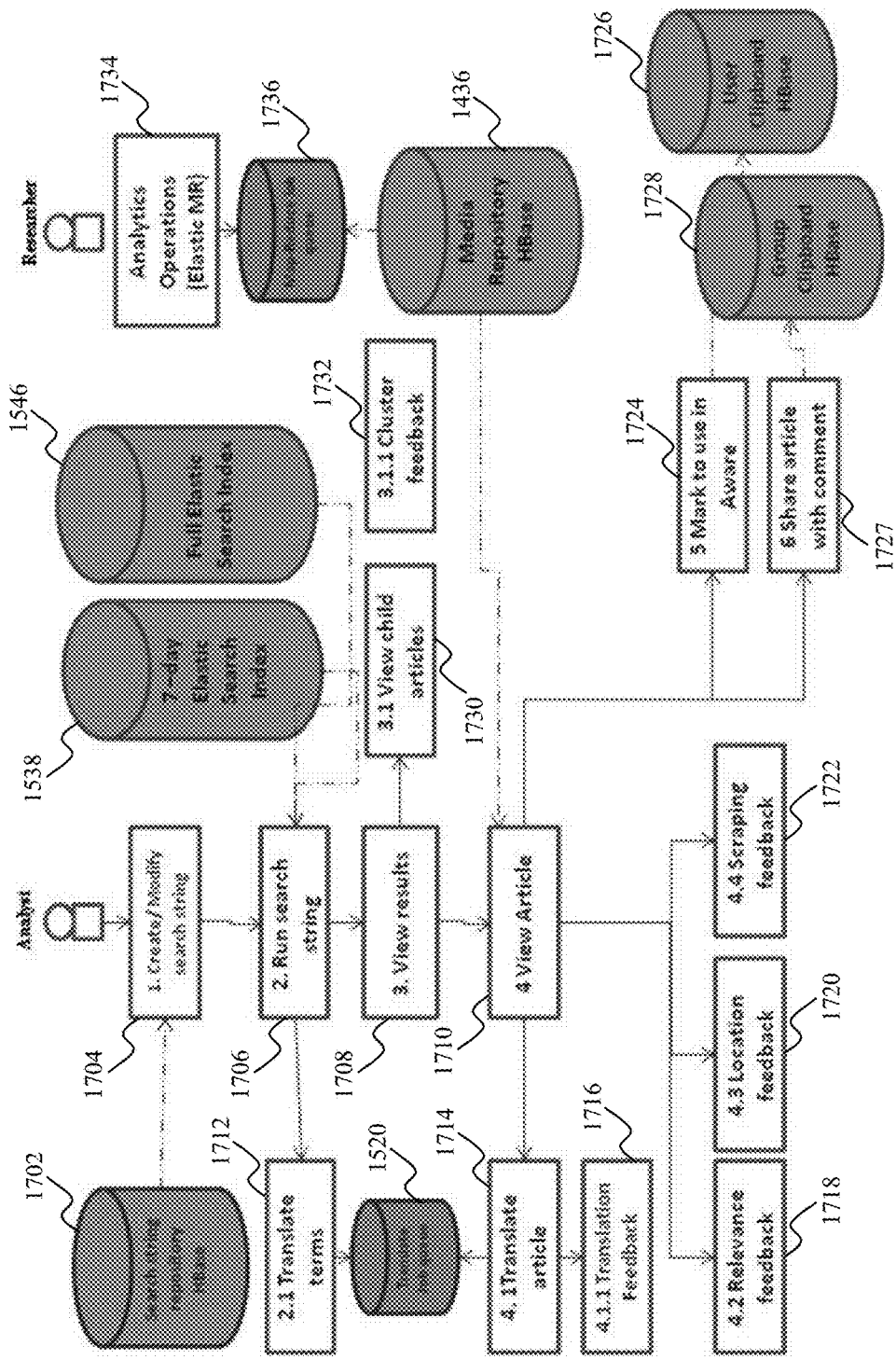
FIG. 17 is a block diagram showing components of the system.

Turning to FIGS. 15, 16, and 17, shown therein are a block diagrams showing the components of the information ingest and processing, source management components, and information source searching features.

As shown in FIG. 15, the robot repository HBase 1410 controls the Kapow scheduler 1412 to initiate a capture job 1502, whose results go to a raw capture data HBase 1504 and a completed job queue 1506. Information from the latter goes to the message queue manager (Rabbit MQ) 1418, which submits jobs to the next queue in the workflow at 1508. Failed jobs go to a failed job queue 1510, a failed job server 1512, and failed job processing 1514. If the failed jobs are not fixable, they go to a script repository HBase 1516. Completed jobs go to a transform job queue 1518, a translate job queue 1520, and an index job queue 1522. They then go to translation servers 1524, which translate titles at 1526, and transform servers 1528, which transform the format at 1530, and supply the results to the media repository HBase 1436. Index servers 1532 index the articles at 1534 for language indexes 1536, 1-week indexes (elastic search) 1538, and search-term indexes (elastic search) 1546. There are also routines to cluster articles at 1540, extract entities at 1542, and extract locations at 1544.

As shown in FIG. 16, a user can interact with the source repository 1404 by viewing an existing source at 1602, modifying source metadata at 1604, adding a source at 1606, or modifying a URL or scheduling at 1608. A sourcing manager can approve any such changes at 1610, archive the sources at 1612, or change scheduling at 1614. A scripter can view the script source at 1616 or schedule a one-time scrape and ingest at 1618. The latter goes to capture and ingestion processing 1620 and an external collection system 1622. An analyst can examine the result at 1624.

As shown in FIG. 17, an analyst can retrieve a search string from a search string repository HBase 1702, create/modify a search string at 1704, run the search string at 1706, view the results at 1708, and view an article at 1710. A request to translate the search terms at 1712 or to translate an article at 1714 goes to a translate job queue 1520. The translation of the article also goes to translation feedback 1716. Upon viewing the article at 1710, the analyst can give relevance feedback at 1718, location feedback at 1720, or scraping feedback at 1722. The analyst can also mark the article to use in AWARE at 1724, in which case the article goes to a user clipboard HBase 1726, or share the article with a comment at 1727, in which case the article goes to a group clipboard HBase 1728. The analyst can also view child articles at 1730 or give cluster feedback at 1732. The search string is run at 1706 on either or both of the 7-day elastic search index 1538 and the full elastic search index 1546. A researcher can perform analytics operations at 1734 through a map-reduce job queue 1736 on the media repository HBase 1436.

Analytics Subsystem

Figure 18:
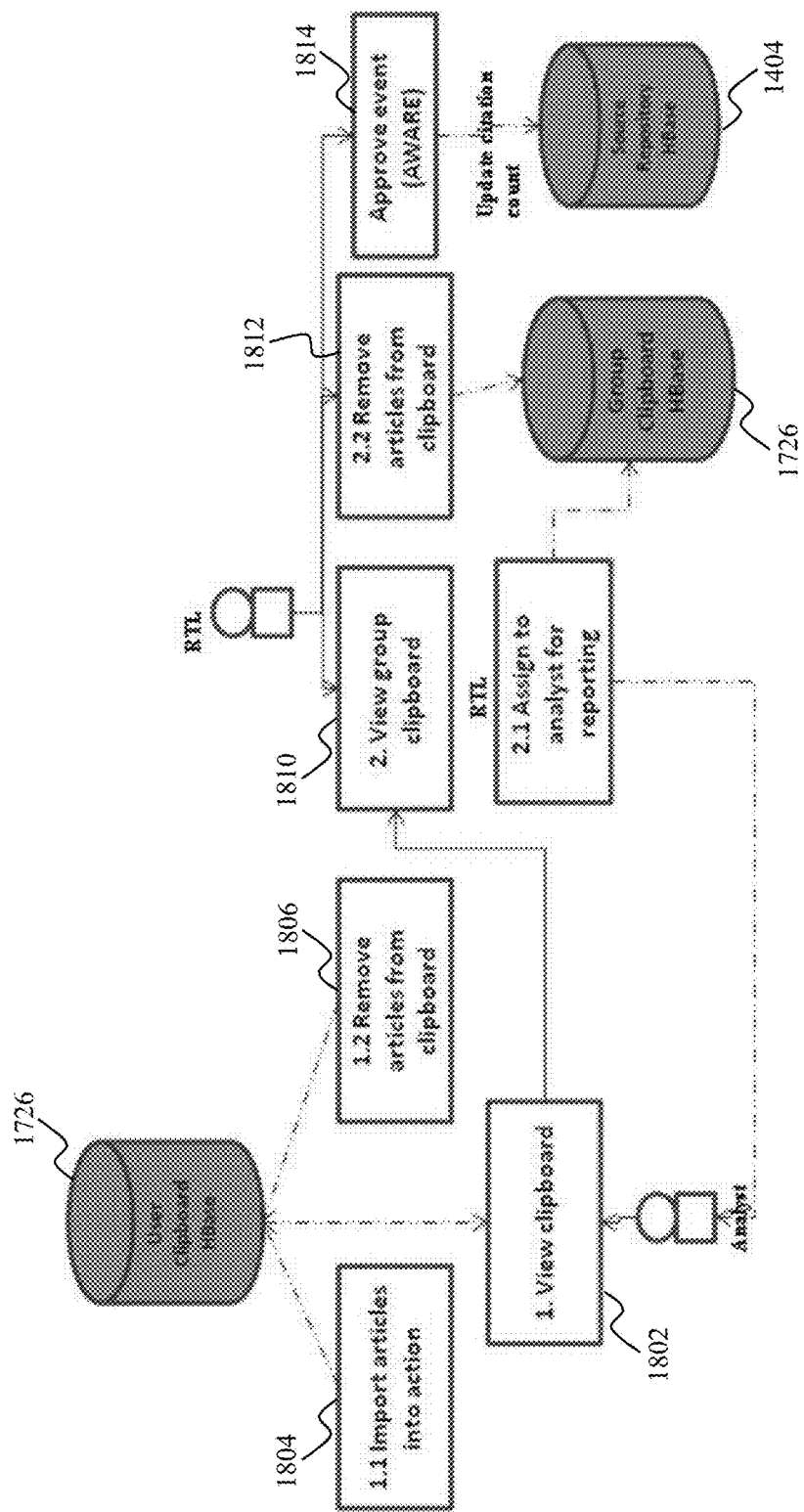
FIG. 18 is a block diagram showing components of the AWARE integration with HBase.

Turning to FIG. 18, shown therein is a block diagram showing components of the AWARE integration with HBase, as discussed below. As an overview, with regard to the user clipboard HBase 1726, an analyst can view the clipboard at 1802, import articles at 1804, or remove articles at 1806. An article can be assigned to the analyst for reporting at 1808, in which case the article is placed in the group clipboard HBase 1726. The group clipboard can be viewed at 1810 or have articles removed therefrom at 1812. An event can be approved for AWARE at 1814, in which case the citation count is updated in the source repository HBase 1404.

The AWARE component of the analytics subsystem provides the analytics services that would allow the users to tag and code semantic triples, rank articles, manage topics, and generate analytics report. One of the major characteristics of AWARE is its use of semantic coding of subject-verb-object triples for each action. The ontology is the hierarchy of semantic codes, plus triples that define the components of events and actions. The OWLIM database ("triplestore"), stores the triples.

The OWLIM database has the concept of a "context" which is a named group of triples. Updates and deletes can be restricted to a given context, and all the statements belonging to a context can be removed at once. The easiest method of changing the ontology is to remove an entire ontology context and replace it with a new one. OWLIM can use files in RDF format.

The AWARE program takes advantage of the event and action definitions in the ontology contexts to eliminate recoding in the Groovy Server Pages (gsp) files when changes to the ontology are needed.

An AWARE report covers a single event, which may have multiple actions. AWARE may be used for various threat domains, such as but not limited to political instability (PI) and Biosurveillance (BIO). There is no difference in the data collected at the event level between threat domains. Any changes in the event data collected would need to be addressed in the groovy (JAVA-like GRAILS language) code in AWARE and the .gsp files generated. Each threatdomain has its own actions, which can be of multiple types. When the threatdomain dropdown has been used to select a threat domain, AWARE uses the ArgusWS webservices to find the types of potential actions for that threatdomain from the OWLIM database. The screen is redrawn with the appropriate options. When an "add action" block is selected, control passes to a gsp page designed for the specific action type.

The add/edit action pages use the definitions within the database as an aid to laying out the screen. The location of the items above the triple entry bar may be hard-coded in the gap. The triples, and items below them are selected based on the property :hasXXX being a subclass of :SubjectModifiers, :VerbModifiers or ObjectModifiers. A MainModifiers class could be automatically assigned.

The Protege program provides a way to visualize the layers and interconnections within the ontology. The RDF/XML ontology file has three major sections:

(1) Namespaces: The first section of the file defines the namespaces used in the database. Every item within the database belongs to a namespace. The PREFIX command one create a shortcut so that one does not have to type the full namespace string every time.

(2) Event and Action Properties: for :Event and :Action, the elements of events and actions are defined as properties. By convention, the properties are named :hasElement (i.e. :hasStartDate, :hasSubjectNation etc). The properties are defined in the second section of the ontology file. There are two types of data that can be entered. Items that appear in a dropdown box use the ObjectProperty type and Free-text/numeric items are DatatypeProperty type. ObjectProperty hasAbc has an associated class AbcType. The members of class AbcType are the items that will appear in the dropdown box. AbcType is a naming convention that makes things clearer, but has not always been adhered to. For example, :hasSubject uses class :Subject (not :SubjectType), :hasObject uses class :Object, hasThreat gets its values from :ThreatDomain, etc. DatatypeProperty hasAbc defines an xml datatype as the type of values to be entered. AWARE can allow different vocabularies at the action level for different threat domains. Each property's values need modifiers indicating what threat domain(s) the value should be displayed for. The PI threat domain has one style of Action: ActionPI. The BIO threatdomain has two types of Action: Indirect actions (ActionBIO, very similar to ActionPI), and direct actions, defined by a disease, host and presentation triple (ActionDS).

(3) Classes: The final section of the ontology file is the classes. Bottom level classes define a literal string, with a definition of what their parent class is. Upper level classes provide logical groupings of bottom-level classes (i.e. AcademiaMember is a subclass of Civilian, and Civilian is a subclass of Human).

Higher-level classes include :Event (all the properties associated with an event are connected to the :Event class in the definition of :Event), :Action (properties that are not affected by the threatdomain are included in, and :ActionPI, :ActionBIO, and :ActionDS (properties that are specific to a given threat domain are defined in these classes; if a property is specific to a specific part of a triple (subject/object) or verb, it is also defined to be a subClassOf SubjectModifier, VerbModifier or ObjectModifier).

Actions are specific happenings which form part of an Event. Each Event can have zero or more actions. Actions are the semantic coding of the relevant information within an event, and are fundamentally (subject, relationship, object) triples, with the addition of a date/time range and ( )location information( ).

| Item | Required | Type | Range | Ontology Field | Cardinality | Purpose |
| --- | --- | --- | --- | --- | --- | --- |
| Threat Domain | Y | Ontology URI | Valid threat domains | hasThreat | 1 | Holds the threat domain in which the action is interpreted. |
| Creation Date | Y | date/time | | hasCreationDate | 1 | Records the time the event was first approved by QA and made available to the system |
| Modification Date | Y | date/time | | hasModificationDate | 1 | Records the time the event was most recently modified, defined as the time that QA approved the modification |

-continued

| Item | Required | Type | Range | Ontology Field | Cardinality | Purpose |
|---|---|---|---|---|---|---|
| Start Date | N | date/time | | hasStartDate | 1 | The time at which the represented real world activity started |
| End Date | N | date/time | | hasEndDate | 1 | The time at which the represented real world activity ended |
| Severity | Y | Color | Red, Orange, Yellow, Blue | hasSeverity | 1 | Severity of the event as assigned by the analyst. |
| Subject | Y | Ontology URI | Valid subjects for the given threat domain | hasSubject | 1 | |
| Relationship | Y | Ontology URI | Valid relationships for the given threat domain | hasVerb | 1 | |
| Object | Y | Ontology URI | Valid Objects for the given threat domain | hasObject | 1 | |
| Location | Y | List | | | 1 or more | A list of locations associated with the event. Can not be empty. |
| Domain Properties | N | Property List | Vaild properties | | 0 or more | Specific properties relevant to an event based on Threat Domain |
| Internal Article List | Y | List | Newsstand URL | hasArgus URL | 1 or more | Internal URL references pointing back to the internal copy of an article if it exists. |
| External Article List | Y | List | | hasArticle URL | 1 or more | Actual URL for the article or item as found on the Internet. |
| Subject Nationality | Y | Ontology URI | Valid nationalities | hasSubject Nation | 1 | |
| Object Nationality | Y | Ontology URI | Valid nationalities | hasObject Nation | 1 | |

Actions can have threat domain specific properties or required fields. In order to avoid having to make code changes when threat domains are added or when the ontology changes, domain specific properties are represented as key/value pairs. The key is the property name and the value is an object containing the property type, range information, and the data itself. Applications using these properties are responsible for interrogating the type/range information and processing the data accordingly.

As for location information, the following table identifies some of the applicable data requirements as related to the particular event ontology.

| Item | Required? | Type | Range | Ontology Field | Cardinality | Purpose |
| --- | --- | --- | --- | --- | --- | --- |
| Country | Y | Constrained Text | List of recognized countries | hasCountry | 1 | The country in which the event is occurring |
| Province | N | Constrained Text | List of recognized provinces | hasProvince | 1 | The province in which the event is occurring. |
| City | N | Constrained Text | List of recognized cities | hasCity | 1 | The city in which the event is occurring |
| Geo Point | N | lat/long |  | hasPoint | 1 | A specific point at which the event is occurring (tentative) |

The main table for political geography at a country/province level in Aware/Watchboard is CountryProvinceFlat in the AWARE postgres database. The table corresponds roughly to the list of countries and provinces provided in the GEOPOLITICAL ENTITIES AND CODES gazetteer at http://earth-info.nga.mil/gns/html/gazetteers2.html. The table has 10 columns:

countryname—country name.
fipscountrycode—the two-character code for the country.
regioncode—Argus region (0—unassigned; 1—Southeast Asia; 2—East Asia; 3—Russia/Central Asia; 4—Middle East; 5—South Asia; 6—null; 7—Europe; 8—Africa; 9—Americas).
sortname—province name.
admin_id—function unclear.
latitude.
longitude.
province_id—sequence number id (primary key).
adm1—administrative code for the province.
geonameid—entry in the geonames table for this province or country.

City names may be obtained from sources such as www.geonames.org, and contain most population centers with a population of over 5000 people. The country and province are correlated in the hierarchy table to the appropriate geonames entry, and then used to look up cities.

Properties are attached to Actions and specify additional information beyond the core data. Properties are Threat Domain specific.

| Item | Required? | Type | Range | Ontology Field | Cardinality | Purpose |
| --- | --- | --- | --- | --- | --- | --- |
| Name | Y | text | defined from Ontology | "hasXXX" fields not used elsewhere* | 1 | Names the type of the property |
| Value | Y | Varies | Defined from Ontology | Defined by Ontology for the field* | 1 | Gives the value for that property |

*Property fields can be designated by metadata within the ontology, or are defined by default as "everything else". This is programmatically encapsulated using either an include list (explicitly listing the properties for a domain) or an exclude list (listing the ones not to count).

Events can span a variable range of time, to leave flexibility for events which could logically span more than a single point in time, such as a disease outbreak or a long standing protest. The actual length of an event in any given threat domain will be determined methodologically and enforced through QA and training.

An event does need to be fixed in time, and from the methodological standpoint it makes the most sense to date each event with its creation, which is defined as the time at which QA first certifies that the Event is good to be added into the system. Events can evolve over time, so an event will also keep a record of the last modification time. As both of these times represent when an event was manipulated within the system, there will also be a start and end time which will represent the actual beginning and end of the real world event being described. These fields are optional.

Events can evolve over time, with new information being added as it becomes available.

Actions entered as part of an Event will have independent start and end times which represent the window of time over which that action took place. The start time can not be before the start time of the containing Event. The end time can not be after the end time of an Event. These fields are both required. In practice, it was decided that adding an action with a start or end time outside of the containing Event would simply reset the appropriate fields within the event.

Figure 19:
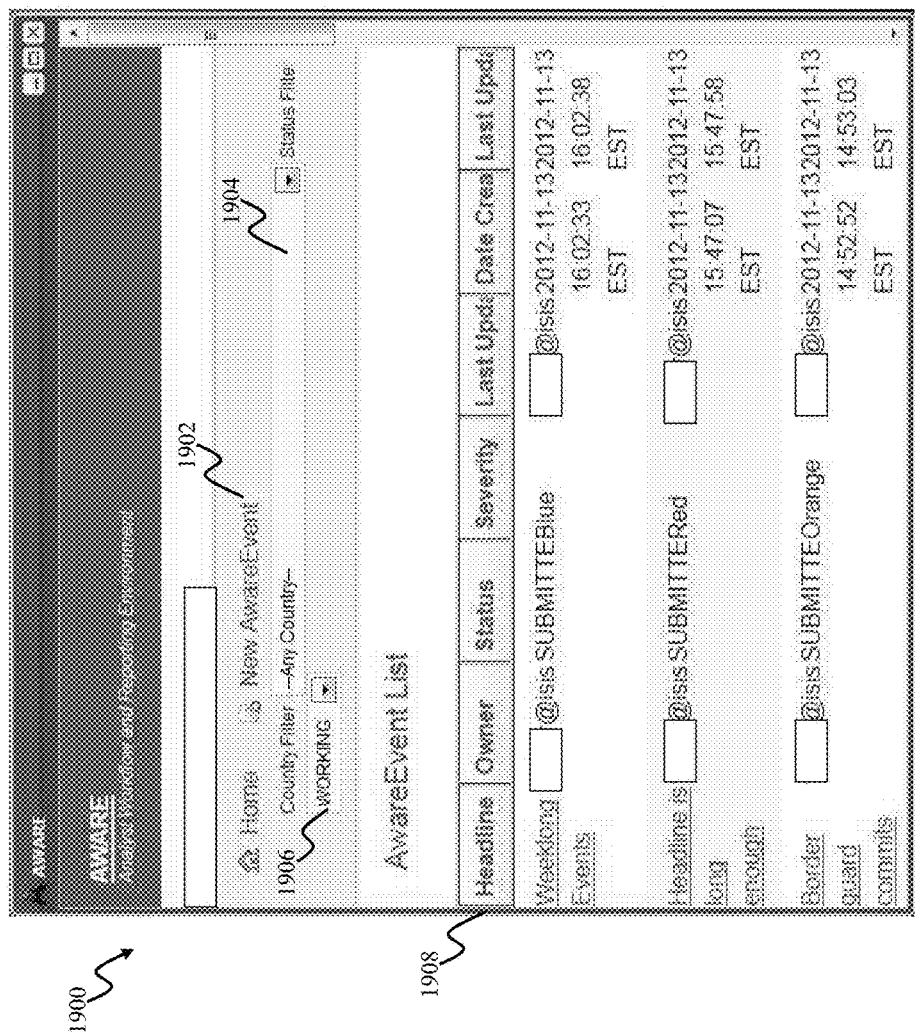
FIG. 19 is a partial screen shot diagram of a user interface used as part of the analytics subsystem feature of the preferred embodiments.

Turning now to FIG. 19, shown therein is a partial screen shot diagram 1900 of a user interface used as part of the analytics subsystem feature. In the figure, the AWARE interface allows a user to create a new event using the NEW AWAREVENT icon link 1902, filter existing reports and information using a COUNTRY FILTER 1904, and filter event reports based on status, such as WORKING, using a status filter 1906. The interface also provides navigation 1908 to sub-pages for HEADLINE, OWNER, STATUS, SEVERITY, LAST UPDATE, DATE CREATED, LAST UPDATED.

With regard to event reports under the Analytics subsystem, the system allows for post-approval edit requests. The event may be modified in the AWARE Postgres database. Depending on the nature of the changes, the MESSAGEDB and Owlim databases are modified as well. The process is done by locating the event in the AWARE Postgres database. The event approval process spawns entries in the MESSAGEDB (watchboard dot) database and Owlim triplestore. Delete entries in MESSAGEDB. Delete codes in OWLIM triplestore if necessary. Select the production repository from the list of repositories. Find the associated actions for the affected event. Click on the action number to see all the triples associated with the action. Select Modify/Remove from the left menu. Enter the values for subject, predicate, object and context from above and click the Remove button. Finally, change the event back to an editable state. Go back to the AWARE eventmaster table window.

Visualization Subsystem

Tuning again to FIG. 13, the Watchboard interface is described in detail above in the documents incorporated by reference herein.

The analytics and visualization subsystems may draw from information and data stored in a cloud. Cloud access is provided for by first preparing a client device, installing the applicable database locally or on the server side, installing user applications, and starting up the system when it is configured. The hardware and software needed for the cloud include four core servers (ingest1, ingest2, retrieval1, retrieval2), one server for consumer queue clients (clients1), and additional servers as necessary for configuration management and translation. Servers may be Amazon M3 Extra Large instances with 4 cores and 15 GB of memory, or Amazon M1 Medium. Memory may need to be as much as, for example, 21 GB for MySQL and 5 GB for Kapow.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. For example, disclosures of particular technologies and of particular technical standards are illustrative rather than limiting. Accordingly, it is intended that the invention be limited only to the extent required by the appended claims, prior art, and applicable rules of law.

We claim:

1. A system for detecting and communicating event-related information, comprising:
   one or more processors; and
   one or more persistent storage media storing code that, when executed on the one or more processors, controls the one or more processors to implement:
   an information collection subsystem for downloading documents from information sources;
   an information storage and archive subsystem for storing the downloaded documents, one or more user-provided parameters, and at least one of the user-provided parameters is based on indications and warnings indicative of a socially disruptive event;
   an information tagging subsystem that:
      displays text from one of the downloaded documents via a user interface;
      provides functionality for a user to select a portion of the text in the displayed document;
      provides functionality for the user to select a concept from a predefined list of concepts related to socially disruptive events;
      associates the selected concept with the selected portion of the text; and
      stores the selected concept;
   an information analysis subsystem for identifying, based on the text of downloaded documents and the selected concept, one or more of the downloaded documents containing the at least one parameter and storing a summary report based on the identified documents; and
   an information communications subsystem for receiving the summary report and outputting the summary report based on the one or more user-provided parameters.

2. The system according to claim 1, wherein at least one of the downloaded documents includes audio or video.

3. The system according to claim 1, wherein the information analysis subsystem identifies the downloaded documents based on an English- or foreign-language Boolean search string formulated based on at least one of the indications and warnings.

4. The system according to claim 1, wherein the information communications subsystem comprises a schedule related to the timing of when the summary report is pushed, distributed, displayed, made available, or otherwise transmitted.

5. The system according to claim 1, wherein the user-provided parameters are stored in a user profile database.

6. The system according to claim 1, wherein one of the user-provided parameters is an identification of a user's mobile device for accessing the mobile device.

7. The system according to claim 1, wherein one of the user-provided parameters is an identification of a type of alert desired.

8. The system according to claim 1, wherein the information tagging subsystem provides functionality for the user to select the concept from a drop down menu comprising the predefined concepts.

9. The system according to claim 8, wherein the drop down menu comprises a list of subject-verb-object codes stored in a database.

10. The system according to claim 8, wherein the drop down menu comprises a list of tags, the tags comprising alerts and indicia.

11. The system according to claim 1, further comprising:
an information visualization subsystem for aggregating and then displaying the information from or about the documents.

12. The system according to claim 11, wherein the displaying of information comprises displayed the information in a word cloud.

13. The system according to claim 11, wherein the displaying of information comprises displaying the information on a map.

14. The system according to claim 11, wherein the information comprises at least one link to additional information regarding a socially disruptive event.

15. The system according to claim 11, wherein the displaying of information comprises displaying the information on a timeline.

16. A computer-implemented method for detecting and communicating event-related information, the method comprising:
automatically downloading at a server documents from one or more information sources containing parameters based on indications and warnings indicative of socially disruptive events;
identifying, in the server, relevant indications and warnings in the downloaded documents based on the presence of the parameters or one or more keywords in the documents;
displaying, via a user interface, text from one of the downloaded documents containing at least one of the relevant indications and warnings;
providing functionality, via the user interface, for a user to select a portion of the text in the displayed document;
providing functionality, via the user interface, for the user to select a concept from a predefined list of concepts related to socially disruptive events;
aggregating information from the documents based on their relevance to the socially disruptive events and storing a summary report based on the aggregated information; and
outputting the summary report to a broadcast subsystem based on one or more user-provided preferences.

17. The method according to claim 16, further comprising:
storing the parameters.

18. The method according to claim 16, further comprising:
identifying a specific type of socially disruptive events from a list of event-specific domains,
wherein the predefined list of concepts is related to the specific type of socially disruptive events.

19. The method according to claim 16, further comprising:
receiving and storing the user-provided preferences, including reporting requirements.

20. The method according to claim 16, wherein the documents are downloaded by automatically crawling the Internet and downloading information from the information sources.

21. The method according to claim 16, further comprising:
storing event-related reports based on the documents.

22. The method according to claim 16, further comprising:
receiving and storing the user-provided preferences, including preferences related to pushing, distributing, displaying, or making available event-related information to the user.

23. The method according to claim 16, further comprising:
receiving user-profile information, including the user-provided preferences; and
storing the user-profile information in a user-profile database.

24. The method according to claim 16, further comprising:
receiving location information about one or more users or one or more users' location-enabled mobile devices.

25. The method according to claim 16, further comprising:
pushing event-related information to the user.

26. The method according to claim 25, wherein the event-related information is pushed to the user or pulled by the user as an RSS feed.

27. The method according to claim 25, wherein the event-related information is pushed to the user or pulled by the user from a web site.

28. The method according to claim 25, wherein the event-related information is pushed to the user as an email to the user's mobile device.

29. The method according to claim 25, wherein the event-related information is pushed to the user as a text alert.

* * * * *